(12) United States Patent
Horn et al.

(10) Patent No.: US 7,839,834 B2
(45) Date of Patent: Nov. 23, 2010

(54) RADIO LINK PROTOCOLS FOR A WIRELESS COMMUNICATION SYSTEM

(75) Inventors: Gavin Bernard Horn, La Jolla, CA (US); Avneesh Agrawal, San Diego, CA (US); Donald William Gillies, San Diego, CA (US); Nikhil Jain, San Diego, CA (US); Sumantra Chakravarty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 11/020,410

(22) Filed: Dec. 22, 2004

(65) Prior Publication Data

US 2005/0281243 A1 Dec. 22, 2005

Related U.S. Application Data

(60) Provisional application No. 60/580,753, filed on Jun. 18, 2004.

(51) Int. Cl.
*H04J 1/00* (2006.01)
(52) U.S. Cl. ............... 370/343; 370/345; 709/227; 455/515; 455/517
(58) Field of Classification Search ............... 370/94.1, 370/310–345; 709/227; 455/515, 517
See application file for complete search history.

(56) References Cited

U.S. PATENT DOCUMENTS 5,774,479 A * 6/1998 Lee et al. ............... 714/749

(Continued)

FOREIGN PATENT DOCUMENTS

EP 1063863 12/2000

(Continued)

OTHER PUBLICATIONS

Haas et al., "Mobile-TCP: An Asymmetric Transport Protocol Design for Mobile Systems", Communications, 1997. ICC '97 Montreal, Towards the Knowledge Millennium. 1997 IEEE International Conference on Montreal Que., Canada Jun. 8-12, 1997, New York, NY, USA, IEEE, US, pp. 1054-1058.*

(Continued)

*Primary Examiner*—Dwayne D Bost
*Assistant Examiner*—Amancio Gonzalez
(74) *Attorney, Agent, or Firm*—Sandip S. Minhas; Liem T. Do

(57) ABSTRACT

A forward link (FL) RLP and a reverse link (RL) RLP that are different in design are used for data transmission on the forward and reverse links, respectively. The asymmetric RLP designs may be quantified by, e.g., different feedback mechanisms and/or different data transmission mechanisms used for these RLPs. The FL RLP may utilize a negative acknowledgment (NAK)-based feedback mechanism whereas the RL RLP may utilize an acknowledgment (ACK)-based feedback mechanism. The NAK-based FL RLP may transmit each RLP frame once in sequential order and retransmit RLP frames out of sequence when not received correctly. The ACK-based RL RLP may transmit RLP frames in sequential order, one frame at a time until the frame is received correctly or the maximum number of transmissions have been attempted. Timers with adaptive values computed based on actual traffic conditions may be used to facilitate data transmission by the NAK-based FL RLP.

31 Claims, 12 Drawing Sheets

U.S. PATENT DOCUMENTS

| | | | | |
|---|---|---|---|---|
| 5,793,744 | A | 8/1998 | Kanerva et al. | 370/209 |
| 6,226,301 | B1* | 5/2001 | Cheng et al. | 370/474 |
| 6,581,176 | B1* | 6/2003 | Seo | 714/749 |
| 6,657,984 | B1* | 12/2003 | Semper | 370/338 |
| 2002/0191544 | A1* | 12/2002 | Cheng et al. | 370/236 |
| 2003/0028837 | A1 | 2/2003 | Oh | 714/748 |
| 2003/0036399 | A1* | 2/2003 | Casaccia et al. | 455/515 |
| 2003/0191844 | A1* | 10/2003 | Meyer et al. | 709/227 |

FOREIGN PATENT DOCUMENTS

| | | |
|---|---|---|
| JP | 2000049866 | 2/2000 |
| JP | 2003179581 | 6/2003 |
| JP | 2007516483 | 4/2005 |
| WO | WO0105121 A1 | 1/2001 |
| WO | WO 2004/015955 A1 | 2/2004 |

OTHER PUBLICATIONS

Hossain et al, "Hierarchical Constellations for Multi-Class Data Transmission over Block Fading Channels", Vehicular Technology Conference, 2004. VTC 2004-Spring. 2004 IEEE 59TH Milan, Italy May 17-19, 2004, Piscataway, NJ, USA, IEEE, US, vol. 2, pp. 934-938.*

Chuah et al, "Performance of Two TCP Implementation in Mobile Computing Environments", Global Telecommunications Conference, 1995. Conference Record. Communication Theory Mini-Conference, Globecom '95, IEEE Singapore Nov. 13-17, 1995, New York, NY, USA, IEEE, US, pp. 339-344.*

ETSI, "Universal Mobile Telecommunications System(UMTS): Radio Link Control (RLC) Protocol specification (3GPP TS 25.322 Version 5.2.0 Release 5; ETSI TS 125 322 (pp. 1, 23-27, 42-63)" Sep. 2002, ETSI Standards, European Telecommunications Standards Institute, Sophia-Antipo, FR, France, pp. 23-63.*

Haas et al, "Mobile-TCP: An Asymmetric Transport Protocol Design for Mobile Systems", Communications, 1997. ICC '97 Montreal, Towards The Knowledge Millennium. 1997 IEEE International Conference on Montreal Que., Canada Jun. 8-12, 1997, New York, NY, USA, IEEE, US, pp. 1054-1058.

Hossain et al, "Hierarchical Constellations for Multi-Class Data Transmission over Block Fading Channels", Vehicular Technology Conference, 2004. VTC 2004-Spring. 2004 IEEE 59$^{th}$ Milan, Italy May 17-19, 2004, Piscataway, NJ, USA, IEEE, US, vol. 2, pp. 934-938.

Ayanoglu et al, "Airmail: A link-layer protocol for wireless networks", Wireless Networks, ACM, US, vol. 1, No. 1, (Feb. 1, 1995), pp. 47-59.

Sun et al, "Hybrid ARQ and Optimal Signal-to-Interference Ratio Assignment for High-Quality Data Transmission in DS-CDMA", European Transactions on Telecommunications, Wiley & Sons, Chichester, GB, vol. 12, No. 1, (Jan. 1, 2001), pp. 19-29.

Chuah et al, "Performance of Two TCP Implementations in Mobile Computing Environments" Global Telecommunications Conference, 1995. Conference Record. Communication Theory Mini-Conference, Globecom '95, IEEE Singapore Nov. 13-17, 1995, New York, NY, USA, IEEE, US, pp. 339-344.

Kueh et al, "RLC Protocol Enhancement For SIP-Based Session Establishment Over Satellite-UMTS", Personal, Indoor and Mobile Radio Communications, 2004, PIMRC 2004. 15$^{TH}$ IEEE International Symposium on Barcelona, Spain Sep. 5-8, 2004, Piscataway, NJ, USA, IEEE vol. 3, pp. 2061-2065.

Zhao et al, "An Effiecient Real-Time Traffic Scheduling Algorithm in Wireless Networks", CCECE 2003. Canadian Conference on Electrical and Computer Engineering. Montreal, Canada, May 4-7, 2003, Canadian Conference on Electrical and Computer Engineering, New York, NY: IEEE, US, vol. vol. 3 of 3, pp. 1543-1543.

ETSI, "Universal Mobile Telecommunications System(UMTS): Radio Link Control (RLC) protocol specification (3GPP TS 25.322 Version 5.2.0 Release 5; ETSI TS 125 322 (pp. 1, 23-27, 42-63)" Sep. 2002, ETSI Standards, European Telecommunications Standards Institute, Sophia-Antipo, FR, France, pp. 23-63.

Shu Lin et al, "Automatic-Repeat-Request Strategies", Error Control Coding, Fundamentals and Applications, Englewood Cliffs, Prentice Hall, US, 1983, XP002309572, pp. 458-470.

Bai, Yong, et al., "TCP over Asymmetric CDMA Radio Links," Vehicular Technology Conference, 2000, vol. 3, Sep. 24-28, 2000, pp. 1015-1018.

International Search Report and Written Opinion—PCT/US2005/014850, International Search Authority—European Patent Office—Jan. 17, 2006 (040406).

Sun S et al., "Hybrid ARQ and Optimal Signal-to-Interference Ratio Assignment for High-Quality Data Transmission in DS-CDMA" European Transactions on Telecommunications, Wiley and Sons, Chichester, GB, vol. 12, No. 1, Jan. 1, 2001, pp. 19-29, XP001006768. ISSN: 1124-318X Section 2.2, par. 1.

Haas et al., "Mobile-TCP: An Asymmetric transport protocol design for mobile systems" Communications 1997. ICC 97 Montreal. Towards the Knowledge Millennium. IEEE International Conference on Jun. 1997. vol. 2, pp. 1054-1058.

TCP over asymmetric CDMA radio links, Vehicular Technology Conference, 2000. vol. 3, Sep. 24-28, 2000 pp. 1015-1018.

* cited by examiner

RADIO LINK PROTOCOLS FOR A WIRELESS COMMUNICATION SYSTEM

CLAIM OF PRIORITY UNDER 35 U.S.C. §119

The present application for patent claims priority to Provisional Application No. 60/580,753 entitled "A Method of Improving RLP Performance Based on PHY Layer Design" filed Jun. 18, 2004, and assigned to the assignee hereof and hereby expressly incorporated by reference herein.

BACKGROUND

I. Field

The present invention relates generally to data communication, and more specifically to Radio Link Protocols (RLPs) for a wireless communication system.

II. Background

Wireless communication systems are widely deployed to provide various communication services such as voice, packet data, and so on. These systems may be multiple-access systems capable of supporting communication with multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and so on.

A wireless communication system utilizes a physical layer that transmits data using a coding and modulation scheme selected to achieve a target packet error rate (PER) and latency. The PER may be limited by the coding and modulation scheme selected. Additionally, the PER may be limited by the performance of the feedback at the physical layer. For example, a physical layer negative acknowledgement (NAK) for a packet may be incorrectly decoded as a positive acknowledgement (ACK) 2% of the time, resulting in 2% of the packets being incorrectly acknowledged. The target PER may not be sufficiently low for some applications. For example, a physical layer designed to support voice packets at a PER of 1% and a latency of 40 millisecond (ms) may not efficiently support an HTTP browsing application or an FTP download, either of which may achieve higher throughput and shorter download times with a higher latency and a lower PER physical layer.

Many wireless communication systems employ a Radio Link Protocol (RLP) above the physical layer to provide greater reliability for data transmission. The main purposes of the RLP are (1) to provide retransmission, to improve link reliability and performance, and (2) to provide rate adaptation for packet fragments, in the event of changing channel conditions. The RLP supports retransmission of data in order to achieve a lower PER at the expense of higher latency and jitter than what the physical layer can achieve alone. The RLP typically resides at an interior network entity that is remote from an edge network entity providing over-the-air communication. Consequently, feedback from a receiver to a transmitter for RLP is not efficient and incurs prolonged processing and transmission delays. Furthermore, the signaling for the feedback may not be reliable. These two factors complicate the retransmission of data by the RLP.

There is therefore a need in the art for an efficient RLP to improve data transmission performance.

SUMMARY

A forward link RLP (FL RLP) and a reverse link RLP (RL RLP) that are different in design (i.e., asymmetric) and support data transmission on a forward link and a reverse link, respectively, are described herein. The asymmetric RLP designs may be quantified by, e.g., different feedback mechanisms and/or different data transmission mechanisms being used for the FL RLP and RL RLP. For example, the FL RLP may utilize a negative acknowledgment (NAK)-based feedback mechanism whereas the RL RLP may utilize an acknowledgment (ACK)-based feedback mechanism. The NAK-based FL RLP may transmit each RLP frame once, starting in sequential order, and may retransmit RLP frames out of sequence when they are not received correctly. The ACK-based RL RLP may transmit RLP frames in sequential order, one frame at a time until the frame is received correctly or the maximum number of transmissions has been attempted for the frame. The asymmetric RLP designs take advantage of different characteristics for the forward and reverse links to improve performance, as described below.

For the NAK-based FL RLP, an access point may set a retransmit timer whenever there is no more data to send, and may retransmit all or a portion of the last RLP frame when the timer expires. This retransmission allows a user terminal to determine whether the last RLP frame or last few RLP frames are missing. The retransmit timer may be set to an adaptive value that is determined based on statistics of packets received by a transmitter RLP entity at the access point. For example, the adaptive value may be derived based on an average and a mean deviation of (1) inter-arrival times for data packets received by the transmitter RLP entity or (2) inter-departure times for packets sent by the transmitter RLP entity. The NAK-based FL RLP may use a NAK timer to determine when to resend a NAK or to skip over the missing data that was NAK'd and forward subsequent data to the higher layer. The NAK timer may be set to another adaptive value that is determined based on statistics of RLP frames received by a receiver RLP entity at the user terminal.

In alternative embodiments, the NAK-based FL RLP described above may be used for the reverse link, and ACK-based RL RLP described above may be used for the forward link. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Figure 1:
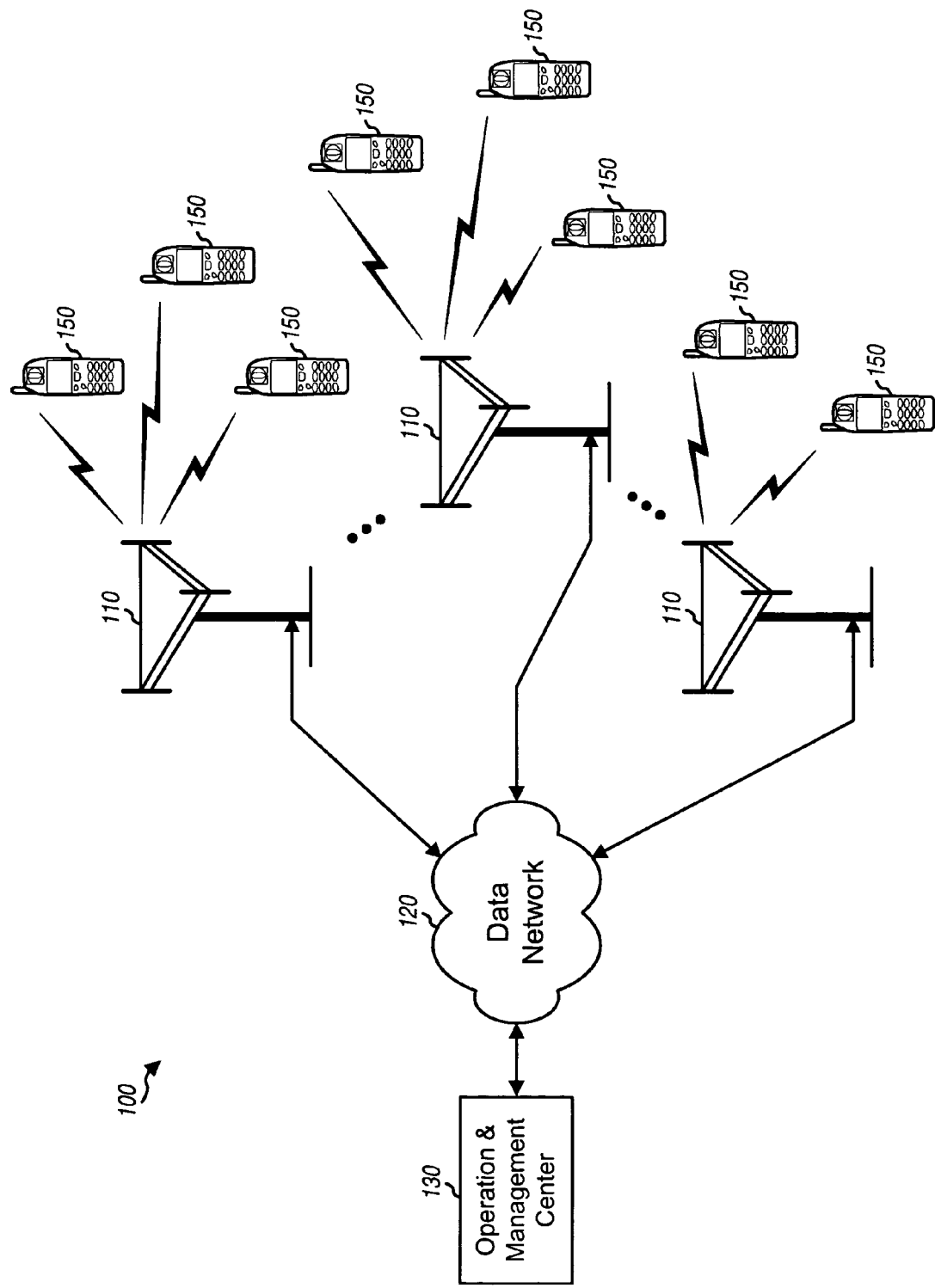
FIG. 1 shows a communication network.

FIG. 1 shows a wireless communication network 100 wherein the RLP described herein may be employed. Network 100 includes access points 110 that support communication for user terminals 150. An access point (AP) is a fixed station used for communicating with the user terminals and may also be called a base station, a base transceiver system (BTS), a node B, or some other terminology. A user terminal (UT) may be fixed or mobile and may also be called a mobile station, a user equipment (UE), a wireless device, a handset, or some other terminology. Each user terminal may communicate with one or multiple access points on the forward link and/or reverse link at any given moment. The forward link refers to the communication link from the access points to the user terminals, and the reverse link refers to the communication link from the user terminals to the access points. The access points further communicate with an operation and management (O&M) center 130 via a data network 120 (e.g., the Internet). O&M center 130 performs a number of functions such as, for example, authentication and authorization of the user terminals, accounting, billing, and so on.

Figure 2:
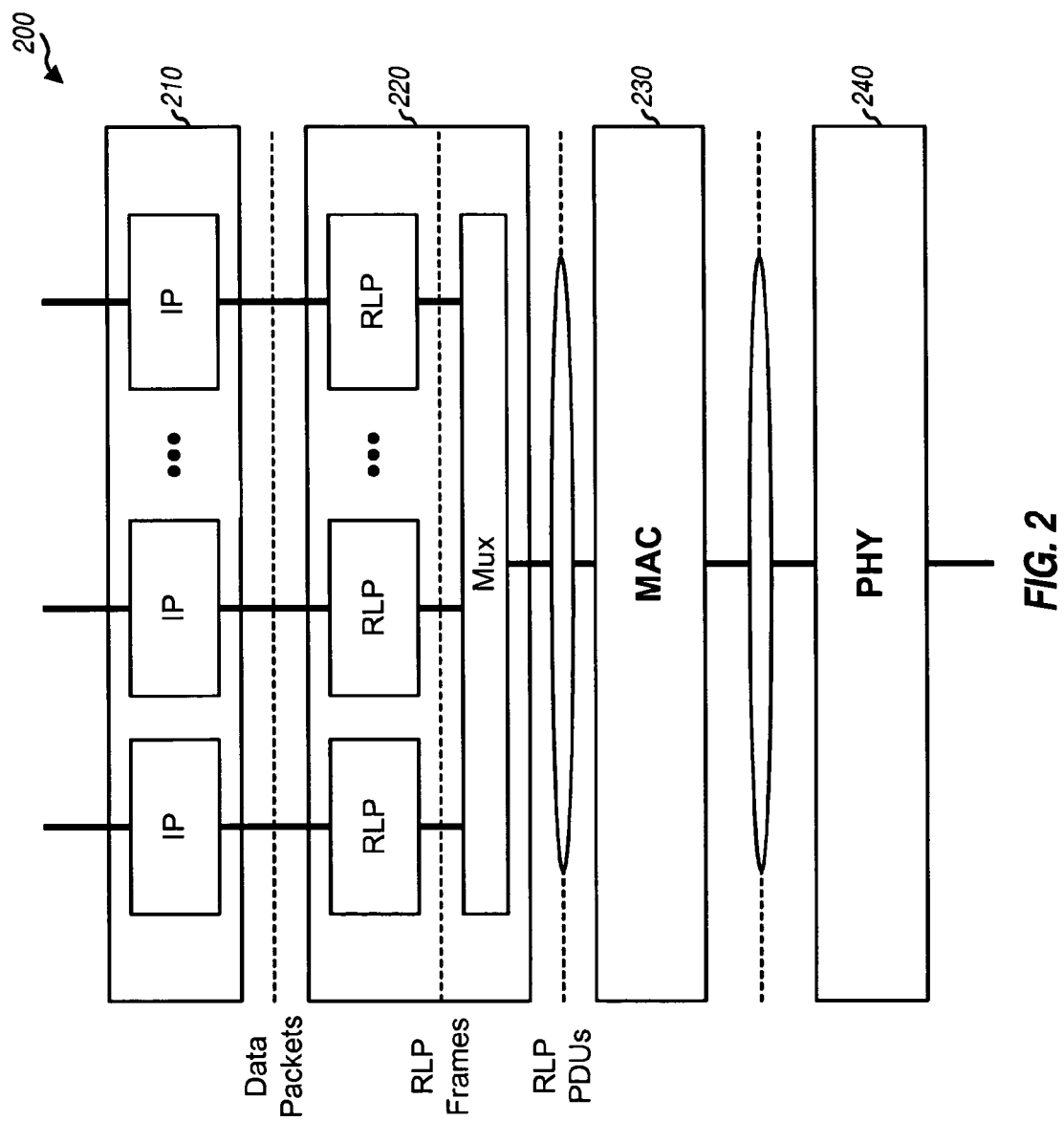
FIG. 2 shows an exemplary protocol stack.

FIG. 2 shows an exemplary protocol stack 200 that may be used by wireless network 100. Protocol stack 200 includes higher layers 210 that implement an Internet Protocol (IP) layer, an RLP layer 220, a Medium Access Control (MAC) layer 230, and a physical (PHY) layer 240. RLP layer 220 may also be part of MAC layer 230. There may also be intermediary layers between IP layer 210 and RLP layer 220 such as, for example, a Point-to-Point Protocol (PPP) layer, or a packet header layer. Higher layers 210 support higher layer applications and provide data packets on different streams. For example, each higher layer application may be sent as a separate RLP stream, or grouped into RLP streams according to the quality of service (QoS) requirements of each application. Alternatively, a higher layer application may be a byte stream. For clarity, the following description is for packet data streams, although the description also generally applies to byte streams. Each packet data system corresponds to one RLP stream.

RLP layer 220 processes each packet data stream and provides a corresponding RLP flow containing RLP frames. The RLP frames for all RLP flows are multiplexed into RLP protocol data units (PDUs), which are sent in one RLP stream to MAC layer 230. RLP layer 220 provides retransmission of data and performs other functions such as, for example, duplicate detection, rate adaptation, in-order packet delivery to the higher layers, fragmentation (on the transmitter side), re-assembly (on the receiver side), padding, encryption, packet discarding (e.g., due to packet latency bound, partial packet loss, or handoff), and so on. MAC layer 230 performs a number of functions such as scheduling of RLP PDUs for the forward and reverse links, power control, rate prediction, QoS arbitration, and so on. Physical layer 240 provides a mechanism for transmitting data over the air and performs various functions such as framing, encoding, modulation, and so on.

For clarity, in the following description, data from the higher layers is referred to as data packets, or simply "packets", and data for RLP flows is referred to as RLP frames, or simply "frames". There is no defined relationship between RLP frames and data packets. A data packet may span multiple RLP frames, and an RLP frame may carry multiple (whole or partial) data packets. The RLP layer may send both packet data frames and control data frames. An RLP PDU may contain RLP frames from one or multiple RLP flows. Additionally, an RLP PDU may contain RLP frames from multiple users, referred to as a multi-user RLP PDU. For simplicity, the processing by the MAC and physical layers is not described below unless pertinent to the present disclosure. The RLP frames may be considered as the data being transmitted over the air.

Figure 3:
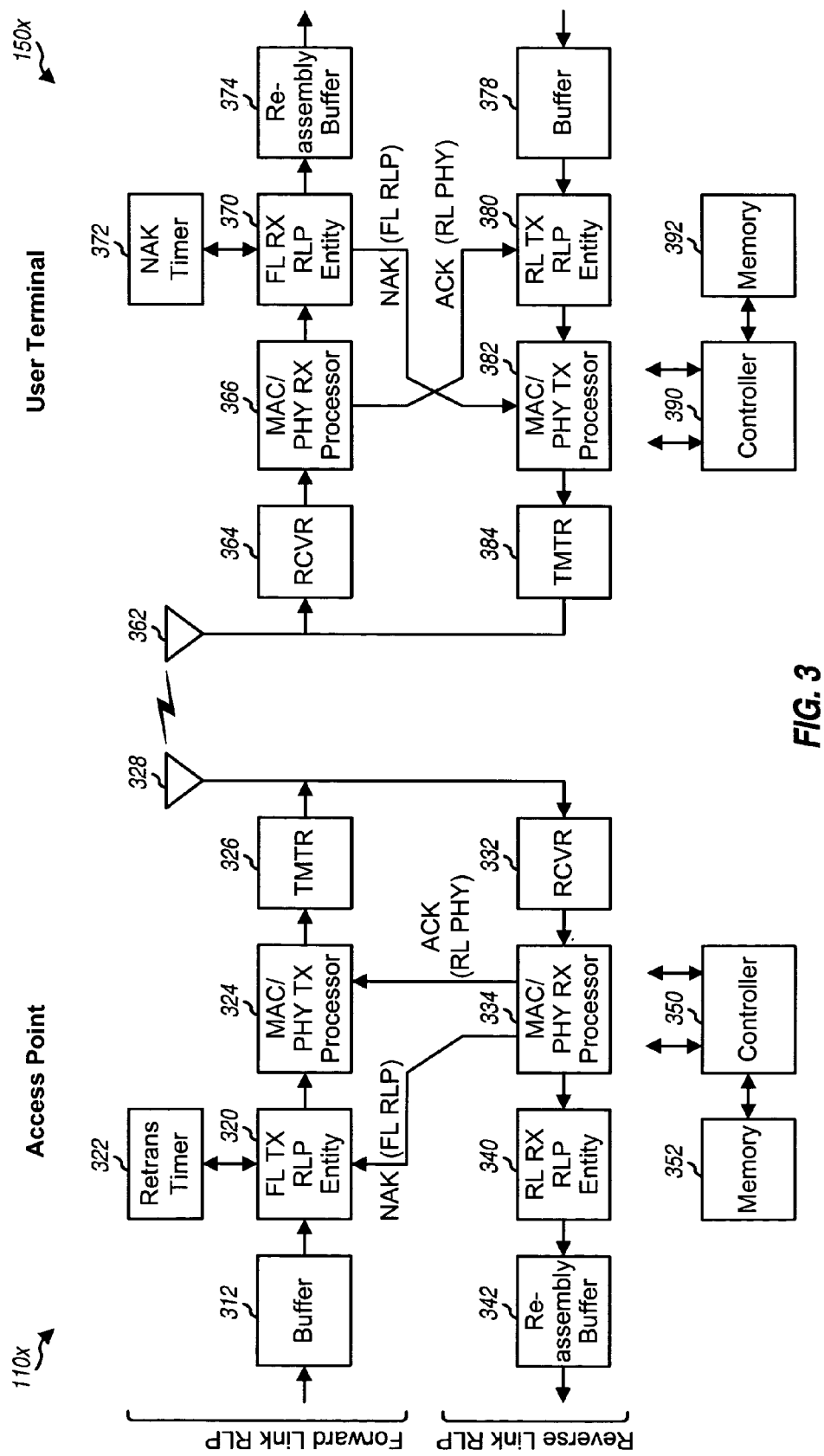
FIG. 3 shows a block diagram of an access point and a user terminal.

FIG. 3 shows a block diagram of an embodiment of an access point 110x and a user terminal 150x, which embody an access point and a user terminal, respectively, in wireless network 100 in FIG. 1. An FL RLP facilitates data transmission from access point 110x to user terminal 150x. An RL RLP facilitates data transmission from user terminal 150x to access point 110x.

For forward link data transmission, at access point 110x, a buffer 312 receives and stores data packets from higher layer applications. An FL TX RLP entity 320 performs RLP processing on the data packets in buffer 312 and provides RLP PDUs containing RLP frames. A MAC/PHY TX processor 324 performs forward link MAC and physical layer processing (e.g., multiplexing, encoding, modulation, scrambling, channelization, and so on) on the RLP PDUs from entity 320 and provides a stream of data samples. A transmitter unit (TMTR) 326 processes (e.g., converts to analog, amplifies, filters, and frequency upconverts) the data sample stream from processor 324 and generates a forward link signal, which is transmitted via an antenna 328.

At user terminal 150x, an antenna 362 receives the forward link signal from access point 110x and provides a received signal. A receiver unit (RCVR) 364 processes (e.g., filters, amplifies, frequency downconverts, and digitizes) the received signal and provides received samples. A MAC/PHY RX processor 366 performs MAC and physical layer processing (e.g., dechannelization, descrambling, demodulation, decoding, demultiplexing, and so on) on the received samples and provides received RLP PDUs. An FL RX RLP entity 370 performs receiver RLP processing on the received RLP PDUs and provides decoded data to a re-assembly buffer 374. FL RX RLP entity 370 also generates NAKs for data detected to be missing and may also generate ACKs for data correctly decoded. The NAKs are sent via the reverse link to access point 110x and provided to FL TX RLP entity 320, which performs retransmission of the missing data. A retransmit timer 322 facilitates retransmission of the last RLP frame to flush out the buffer. A NAK timer 372 facilitates retransmission of NAKs. These timers are described below.

For reverse link data transmission, at user terminal 150x, a buffer 378 receives and stores data packets from higher layer applications. An RL TX RLP entity 380 performs RLP processing on the data packets in buffer 378 and provides RLP PDUs. A MAC/PHY TX processor 382 performs reverse link MAC and physical layer processing on the RLP PDUs from entity 380 and provides a stream of data samples. A transmitter unit 384 processes the data sample stream from processor 382 and generates a reverse link signal, which is transmitted via antenna 362.

At access point 110x, the reverse link signal from user terminal 150x is received by antenna 328 and processed by a receiver unit 332 to obtain received samples. A MAC/PHY RX processor 334 performs reverse link MAC and physical layer processing on the received samples and provides received RLP PDUs. An RL RX RLP entity 340 performs receiver RLP processing on the received RLP PDUs and provides decoded data to a re-assembly buffer 342. MAC/PHY RX processor 334 also generates PHY ACKs for MAC PDUs (and thus RLP frames) received correctly. These PHY ACKs are sent via the forward link to user terminal 150x and provided to RL TX RLP entity 380, which initiates retransmission of frames not received correctly. The FL RLP and RL RLP are described in detail below. In general, ACK and/or NAK feedback may be sent by the RLP, and ACK and/or NAK feedback may also be sent by the physical layer. If the PHY ACK/NAK feedback for a given link is reliable, then the RLP ACK/NAK feedback for that link may not be needed, as described below. For the physical layer, an ACK may be explicitly signaled while a NAK may be indicated by no signal, and vice versa. The transmission of ACK/NAK feedback for the forward and reverse links is described below.

Controllers 350 and 390 direct operation at access point 110x and user terminal 150x, respectively. Memory units 352 and 392 store program codes and data used by controllers 350 and 390, respectively.

Access point 110x may transmit data to one or multiple user terminals simultaneously on the forward link. User terminal 150x may transmit the same data to one or multiple access points on the reverse link. The following description is for forward link data transmission from access point 110x to user terminal 150x and for reverse link data transmission from user terminal 150x to access point 110x.

In an embodiment, the FL RLP and RL RLP are different in design and are asymmetric. The asymmetric RLP designs may be quantified by different feedback mechanisms used for the FL RLP and RL RLP, different data transmission mechanisms used for the forward and reverse links, and so on. The asymmetric RLP designs take advantage of certain characteristics of the forward and reverse links to improve performance, as described below.

Figure 4:
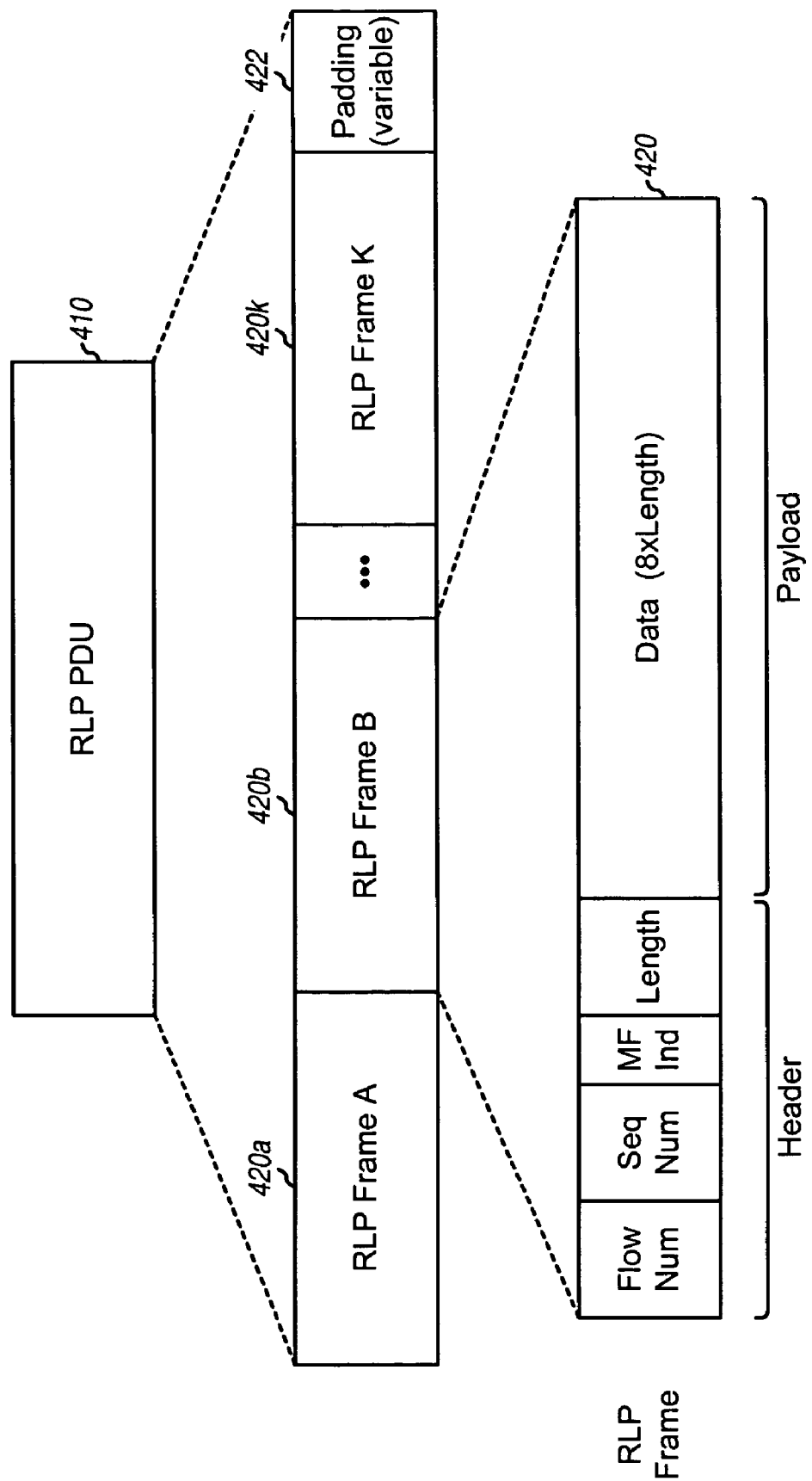
FIG. 4 shows an exemplary RLP frame format.

FIG. 4 shows an exemplary RLP frame format that may be used for both the forward and reverse links. For each link, the TX RLP entity provides an RLP PDU 410 for each slot (or each transmission interval) in which data is to be transmitted. RLP PDU 410 carries one or multiple RLP frames 420 for one or multiple RLP flows and any padding 422 required for the RLP PDU to fill the MAC payload for that slot. The MAC payload and the corresponding RLP PDU size for each slot may be determined based on various factors such as the amount of resources allocated for data transmission in the current slot, the spectral efficiency achieved by the coding and modulation scheme used for the current slot, and so on. The RLP PDU size may change from slot to slot but is known or can be detected by both the transmitter and receiver (e.g., via signaling). For example, a receiver that is expecting a frame in a slot may attempt to decode multiple hypotheses from a subset of combinations of allowed coding and modulation schemes and use a cyclic redundancy check (CRC) to determine if a valid RLP PDU was received.

In an embodiment, each RLP frame 420 includes a header and a payload. The header carries signaling information for the RLP frame and is described in Table 1. The payload carries data for the RLP frame. In another embodiment, each RLP frame may include a trailer.

TABLE 1

RLP Frame Format

| Field | Description |
| --- | --- |
| Flow Num | Identifier for the RLP flow being carried by the RLP frame. |
| Seq Num | Sequence number for the first data unit in the Data field. |
| MF Ind | Indicates if a subsequent RLP frame is included in the RLP PDU. |
| Length | Indicates the length of the Data field. |
| Data | Contains the data payload for the RLP frame. |

The Flow Num field indicates the identifier for the RLP flow being carried by the RLP frame. Each RLP flow is assigned a unique flow number. The RLP flow number allows the TX RLP entity to multiplex different multiple RLP flows onto the same RLP PDU and further allows the RX RLP entity to demultiplex the RLP flows from the RLP PDU. Each flow may be associated with a different QoS and define different RLP parameters. For example, each flow may define a different maximum number of retransmissions; ACK and NAK, NAK only, or no feedback; and so on.

In one embodiment, for each link, each octet or byte of data in each packet data stream may be assigned a sequence number. In another embodiment, each frame may be assigned a sequence number, where the frame size may vary. For clarity in the following description, a data unit is used to describe an octet, a frame, a packet, or some other unit of data that is associated with a sequence number. The sequence numbering for each packet data stream is independent of the sequence numbering for all other packet data streams. The sequence number allows for acknowledgment and retransmission of each data unit in each packet data stream. The sequence number falls within a range of 0 to $2^L-1$, where L is the number of bits used for the sequence number. The sequence numbering starts from 0, goes to $2^L-1$, then wraps around to 0 and continues. The Seq Num field carries the sequence number of the first data unit carried in the Data field of the RLP frame.

The MF Ind field indicates whether another RLP frame will follow in the RLP PDU, where the "MF" stands for more frames. If the RLP PDU carries multiple RLP frames, then the MF Ind field for each RLP frame (except for the last RLP frame) indicates that another RLP frame will follow in the RLP PDU, and the MF Ind field for the last RLP frame indicates that no other RLP frame will follow. The Length field indicates the length of the Data field.

The RLP PDU has a variable size that can change in each slot but this size is known by both the transmitter and receiver, or can be determined by the receiver as described above. The RLP PDU may carry one or multiple RLP frames. Padding is performed on the RLP PDU, if needed, to fill up the RLP PDU. The size of the Padding field is determined by the sizes of all RLP frames carried by the RLP PDU and the size of the RLP PDU, which is determined by the MAC payload.

FIG. 4 shows exemplary formats for RLP frame and RLP PDU. Various other formats may also be used for the RLP frame and RLP PDU, and this is within the scope of the invention.

In an embodiment, the reliability of the RLP for each link is configurable by selecting the maximum number of retransmission attempts allowed for each data unit of data. The reliability (and thus the maximum number of retransmissions) may be determined by the quality of service (QoS), the application type, and so on. Among all RLP flows being sent, RLP frames may be selected for transmission in accordance with the QoS or some other priority scheme for these RLP flows.

1. Forward Link RLP

Figures 5, 6:
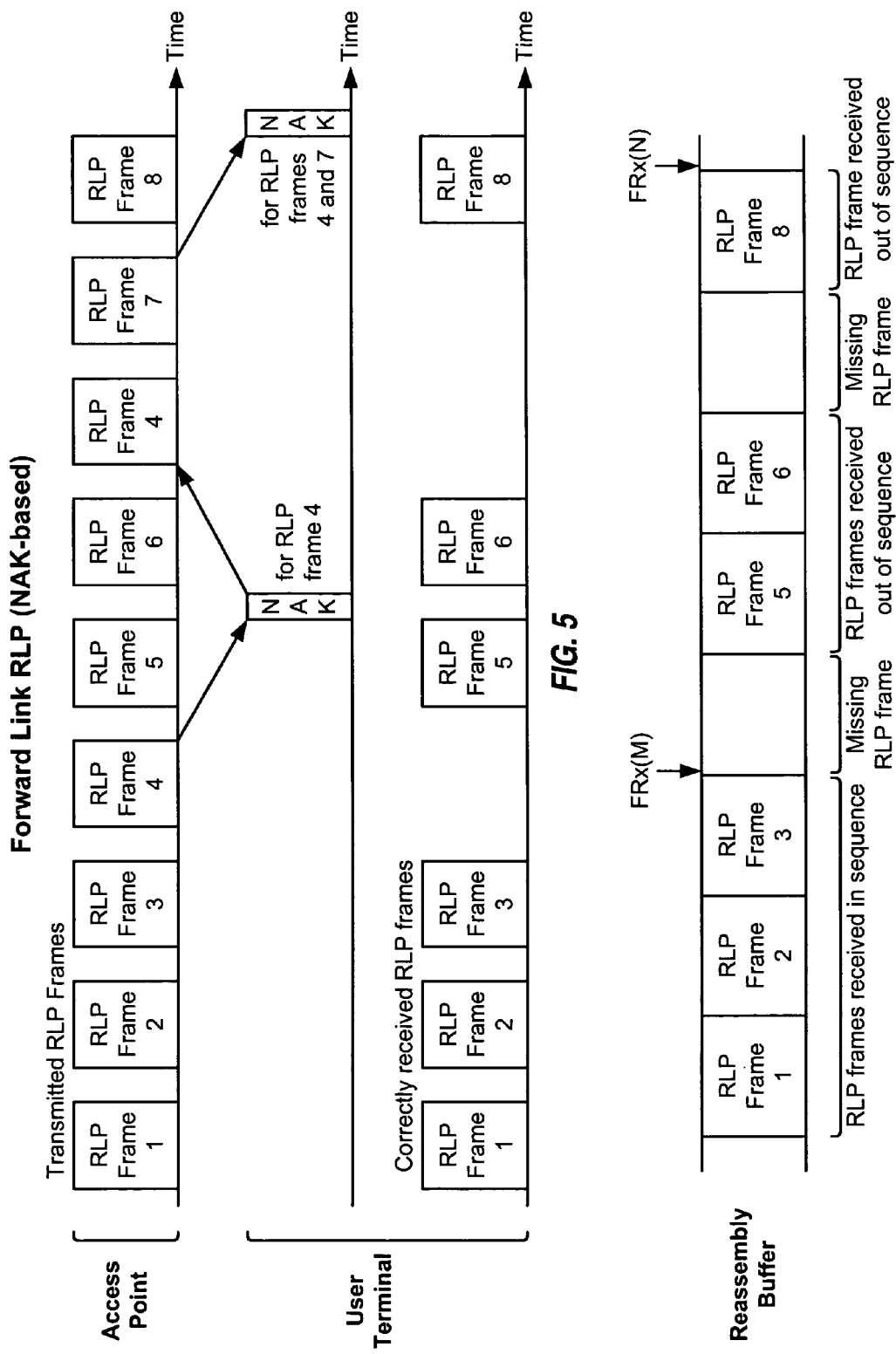
FIG. 5 shows data transmission with a NAK-based RLP.
FIG. 6 shows the content of a re-assembly buffer at the user terminal.

FIG. 5 shows data transmission on the forward link for one RLP flow with the NAK-based FL RLP. The access point sequentially transmits RLP frames 1, 2, 3, 4, 5 and 6. The user terminal receives RLP frames 1, 2 and 3 correctly and does not send any NAK for these frames. The user terminal fails to receive RLP frame 4, receives RLP frame 5 correctly, detects that RLP frame 4 is missing, and sends a NAK for all of the data units in missing RLP frame 4. Upon receiving this NAK, the access point retransmits RLP frame 4 after RLP frame 6 (due to processing and scheduling delays) and then continues to transmit RLP frames 7, 8, and so on. The user terminal receives RLP frame 6 correctly, fails to receive the retransmitted RLP frame 4 as well as the new RLP frame 7, receives RLP frame 8 correctly, detects that RLP frames 4 and 7 are missing, and sends a NAK for all of the data units in missing RLP frames 4 and 7. Although not shown in FIG. 5, the access point would retransmit RLP frames 4 and 7 upon receiving the NAK for these frames. In another embodiment, the maximum number of retransmissions is 1, and the receiver RLP will only send a NAK for RLP frame 7, instead of RLP frames 4 and 7.

FIG. 6 shows the content of re-assembly buffer 374 at the user terminal after reception of RLP frame 8. RLP frames 1, 2, 3, 5, 6 and 8 have been received correctly, with RLP frames 1 through 3 being received in sequence and RLP frames 5, 6 and 8 being received out of sequence. RLP frames 4 and 7 are missing and represent two "holes" in the received data stream. RLP frame 9 is the next new RLP frame to be received.

In general, a NAK-based RLP typically has less feedback than an ACK-based RLP, since most RLP frames are likely to be received correctly and no feedback is needed for these correctly received frames. The transmitter typically does not know if or when data is received for the NAK-based RLP. The receiver can only detect holes or missing data on a flow whenever later data is received correctly on that flow. Several timers may be used to facilitate data transmission with the NAK-based RLP, as described below.

A. Transmitter RLP

The FL TX RLP entity at the access point may maintain the items listed in Table 2 for each RLP flow to facilitate data transmission on the forward link.

TABLE 2

Forward Link Transmitter State

| Item | Description |
| --- | --- |
| FTx(N) | Indicates the next octet of new data to be transmitted. |
| Sequence Number | Indicates the sequence number of the next data unit of new data to be transmitted. |
| Packet Buffer | Contains data packets for which no octets have been sent. |
| Transmitted Buffer | Contains the current data packet being sent and the most recent data packets already sent (up to the transmitted buffer size). |
| Retransmission Buffer | Contains all RLP frames that have been NAK'd by the receiver RLP and not yet retransmitted. |

TABLE 2-continued

Forward Link Transmitter State

| Item | Description |
| --- | --- |
| Retransmit Timer | Timer used to retransmit data to indicate that there is no more data to send. |
| Retransmission Count Structure | Indicates the number of transmission attempts for each RLP frame. |

FTx(N) indicates the next new data octet that has not been transmitted and may be considered as a pointer to the packet buffer, where the "F" stands for the forward link, the "Tx" stands for transmitter, and the "N" stands for next. The L-bit variable Sequence Number indicates the sequence number the next new data unit that has not been transmitted. In one embodiment, the data units are octets and FTx(N) is equal to Sequence Number. Arithmetic operations and comparisons are performed on the sequence number using modulo-$2^L$ arithmetic. For a given sequence number S, the sequence numbers in the range of $S+1$ to $S+2^{L-1}-1$ are considered to be greater than S, and the sequence numbers in the range of $S-2^{L-1}$ to $S-1$ are considered to be smaller than S. Half of the total range is thus considered to be greater than S, and the other half of the total range is considered to be smaller than S.

Three "logical" buffers are used for storing data with different states. The packet buffer stores incoming data packets from the higher layers. The transmitted buffer stores data packets that have been transmitted and which may be retransmitted later. The retransmission buffer stores RLP frames to be retransmitted. Data is logically moved among the buffers as described below. These buffers may be implemented with one or more "physical" buffers.

The retransmission count structure contains an entry for each RLP data unit that is being transmitted or has been transmitted. The entry for each RLP data unit indicates the number of transmissions for that RLP data unit. In another embodiment, a retransmission count structure is not maintained at the transmitter. For example, the RLP receiver may only send a NAK for the earliest hole up to the maximum allowed number of retransmissions. When that hole is filled, the RLP retransmission counter is reset. As another example, the RLP transmitter may always retransmit a data unit that has been NAK'd if that data unit is still available in the buffer, or if the associated packet has not exceeded a maximum latency.

For a NAK-based RLP, a retransmit timer is used to resend the last data in the packet buffer. When the last data unit in the three buffers has been transmitted, then the RLP transmitter sets a retransmit timer. If no more data is received from the higher layers and the retransmit timer expires, then the access point can retransmit all or a portion of the last RLP frame to allow the user terminal to detect whether the last RLP frame is missing. If the transmitter RLP only sends a portion of the last frame, then it sends the last portion of the frame, since in this case the receiver RLP can detect the missing beginning portion of the frame and request a retransmission. Sending a portion of the RLP frame instead of the whole frame is usually more efficient since most RLP frames are expected to be transmitted successfully. If the user terminal receives the retransmission of the last RLP frame but did not receive the last RLP frame, or the last several RLP frames, then the user terminal can detect a hole for the last or last few RLP frames and can then send a NAK for the missing RLP data units. Similarly, an ACK-based RLP may use a retransmit timer to resend the data if no ACK is received before the retransmit timer expires. The retransmit timer may be set to an adaptive value as described below.

Figure 7:
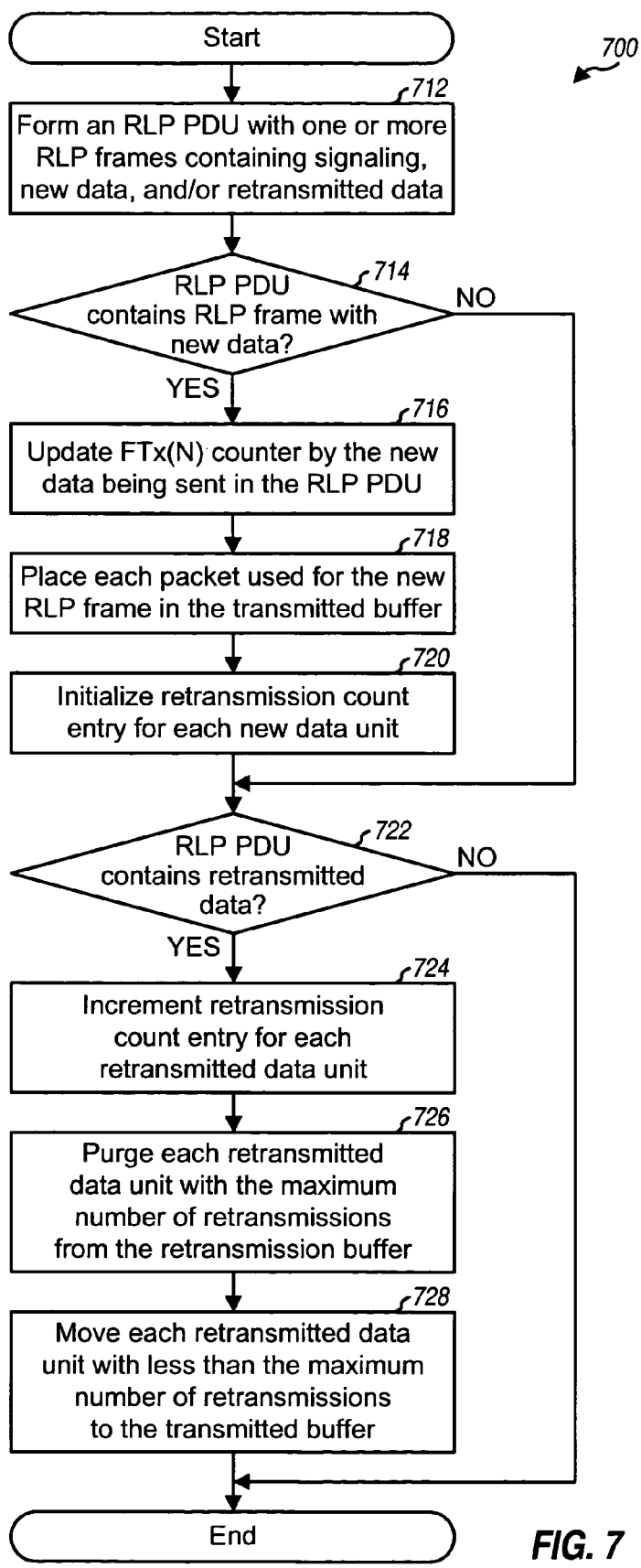
FIGS. 7 and 8 show processes performed by a forward link transmitter (FL TX) RLP entity for data transmission on the forward link.

FIG. 7 shows a flow diagram of a process 700 performed by the FL TX RLP entity for each slot in which data transmission on the forward link to the user terminal is scheduled. The FL TX RLP entity forms an RLP PDU with one or more RLP frames containing signaling, new data, and/or retransmitted data for one or more RLP flows (block 712). The RLP PDU size is determined by a MAC channel assignment for the slot. The RLP PDU is filled with data based on the QoS of the different RLP flows and the priority order for each RLP flow, as described above. The RLP PDU may contain one or multiple RLP frames, for example, one new RLP frame, one retransmitted RLP frame, one new RLP frame plus one or more retransmitted RLP frames, multiple new RLP frames, multiple retransmitted RLP frames, and so on. The retransmitted RLP frame for each hole at the receiver has its own header and can be identified by the user terminal. Each RLP frame may contain an entire data packet, a portion of a data packet, or data for multiple packets. The FL TX RLP entity forwards the RLP PDU to the MAC layer for transmission to the user terminal. The MAC payload may contain non RLP data. For example, signaling information may be sent through a separate signaling protocol.

The FL TX RLP entity updates the state for each RLP flow being sent in the RLP PDU. For simplicity, the following description assumes that only one RLP flow is being sent in the RLP PDU.

If the RLP PDU contains an RLP frame with new data (i.e., data transmitted for the first time), as determined in block 714, then the FL TX RLP entity increments FTx(N) by the amount of new data being sent in the RLP PDU (block 716). The FL RX RLP entity then places each data packet being sent for the first time in the transmitted buffer (block 718) and initializes the entry in the retransmission count structure for each new RLP data unit to '1' (block 720). If the RLP PDU does not contain any new data, then the FL TX RLP entity skips blocks 716 through 720.

If the RLP PDU contains a retransmitted RLP frame, as determined in block 722, then the FL TX RLP entity increments the entry in the retransmission count structure for each data unit in the retransmitted RLP frame (block 724). The FL TX RLP entity also purges each retransmitted RLP data unit with the maximum number of retransmissions from the retransmission buffer (block 726) and moves each retransmitted RLP data unit with less than the maximum number of retransmissions from the retransmission buffer to the transmitted buffer (block 728). If the RLP PDU does not contain any retransmitted data, then the FL TX RLP entity skips blocks 724 through 728.

Figure 8:
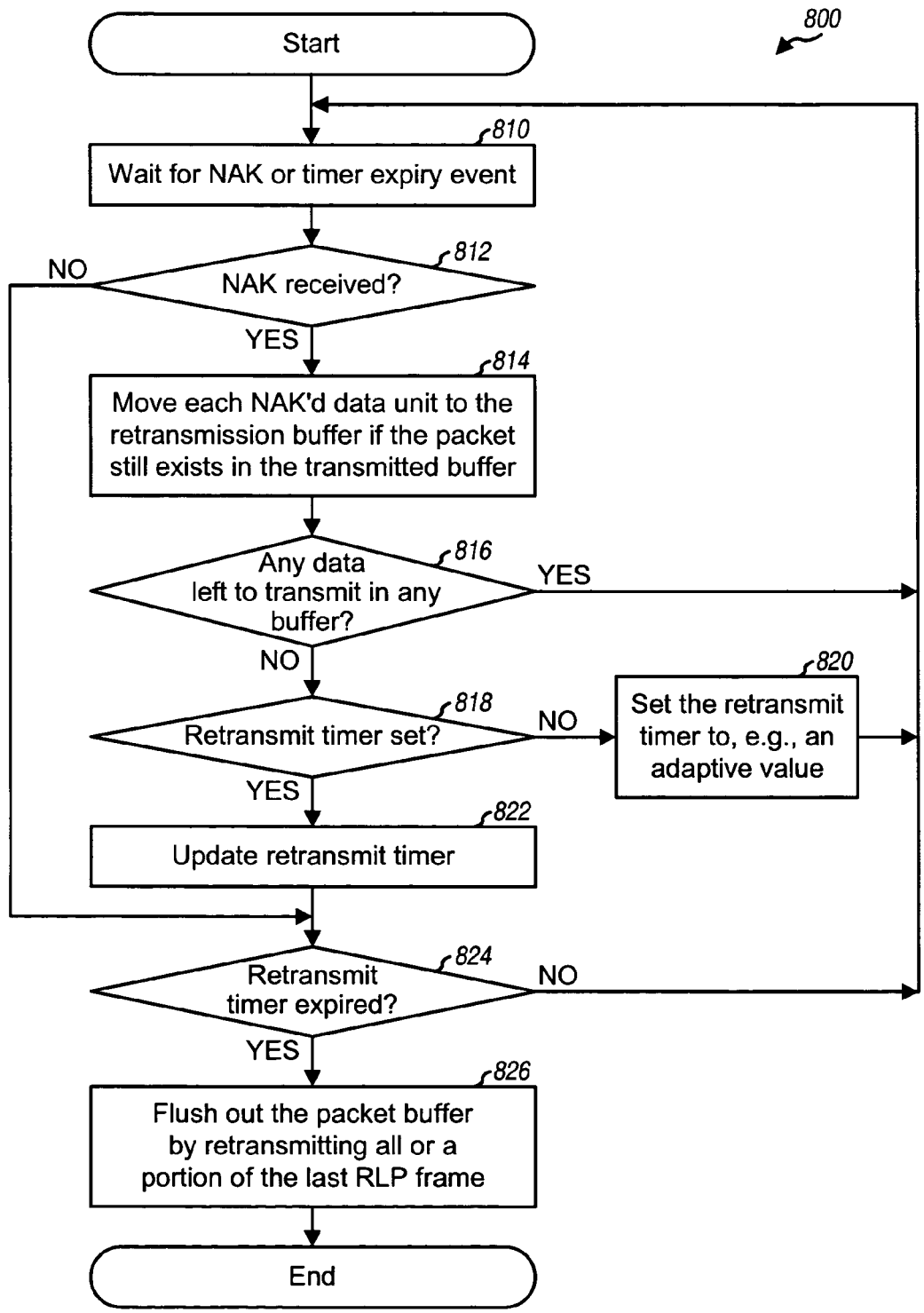

FIG. 8 shows a flow diagram of a process 800 performed by the FL TX RLP entity for data transmission on the forward link. The FL TX RLP entity waits for a NAK or a timer expiry event (block 810). If a NAK was received, as determined in block 812, then the FL TX RLP entity (1) places each NAK'd RLP data unit in the retransmission buffer if the RLP data unit still exists in the transmitted buffer or (2) ignores the NAK'd RLP data unit otherwise (block 814). The FL TX RLP entity may perform a reset for a NAK'd RLP data unit with a sequence number that is greater than the current FTx(N), since the requested data is either too old or has not been transmitted.

After block 814, the FL TX RLP entity determines whether there is any data left to transmit in any of the three buffers (block 816). If the answer is 'Yes', then the FL TX RLP entity returns to block 810. Otherwise, the FL TX RLP entity determines whether the retransmit timer has been set (block 818). If the answer is 'No', then the FL TX RLP entity sets the retransmit timer to an adaptive value computed as described below (block 820) and then returns to block 810. Otherwise, if the retransmit timer has already been set, then the FL TX RLP entity updates the retransmit timer (block 822). After block 822, and also if a NAK was not received in block 812, the FL TX RLP entity determines whether the retransmit timer has expired (block 824). The FL TX RLP entity flushes out the packet buffer if the retransmit timer has expired (block 826) and returns to block 810 otherwise.

The retransmit timer is used to retransmit all or a portion of the last RLP frame. This timer is set whenever the three buffers are emptied and there is no data to send and is deactivated whenever a new data packet is received from the higher layers. If the retransmit timer expires, then all or a portion of the last RLP frame is retransmitted so that the user terminal can determine whether the last RLP frame is missing. In an embodiment, the retransmit timer is set to an adaptive value, which may be computed as follows:

$$A_{pkt}(n)=(1-g_p) \cdot A_{pkt}(n-1)+g_p \cdot M_{pkt}(n), \quad \text{Eq (1a)}$$

$$Err_{pkt}(n)=M_{pkt}(n)-A_{pkt}(n), \quad \text{Eq (1b)}$$

$$D_{pkt}(n)=(1-h_p) \cdot D_{pkt}(n-1)+h_p \cdot |Err_{pkt}(n)|, \text{ and} \quad \text{Eq (1c)}$$

$$RTO_{pkt}(n)=A_{pkt}(n)+k_p \cdot D_{pkt}(n), \quad \text{Eq (1d)}$$

where $M_{pkt}(n)$ is an inter-arrival time (IAT) for data packet n, which is the difference between the arrival times of packet n−1 and packet n at the RLP;

$A_{pkt}(n)$ is an average of the inter-arrival times up to packet n;

$Err_{pkt}(n)$ is a difference between the IAT for packet n and the average IAT;

$D_{pkt}(n)$ is a mean deviation of the inter-arrival times up to packet n;

$RTO_{pkt}(n)$ is a retransmission timeout, which is the adaptive value for the retransmit timer; and $g_p$, $h_p$, and $k_p$ are constants used to compute the adaptive value.

In equation set (1), the average and mean deviation of the packet inter-arrival times are computed based on two infinite impulse response (IIR) filters. The constants $g_p$ and $h_p$ determine the amount of averaging (i.e., the filter time constants) for the average and mean deviation, respectively. The constants may be set as, e.g., $g_p=0.125$, $h_p=0.25$, and $k_p=4$. Equations (1a), (1b), and (1c) may be computed for each new data packet received from the higher layers, and equation (1d) may be computed whenever the retransmit timer is set.

Equation set (1) computes the adaptive value for the retransmit timer as a function of the average and mean deviation of the packet inter-arrival times at the FL RX RLP. The packet inter-arrival times may, in turn, be a function of various factors such as loading on the forward link, the amount of data to send to the user terminal, the priority of the user terminal, and so on. The adaptive value is derived based on the statistics of the inter-arrival times for the data packets received by the RLP and thus adapts to traffic conditions. The adaptive value should be set smaller than a timeout value for a higher layer protocol, e.g., a Transmission Control Protocol (TCP), so that a timeout by the higher layer protocol can be avoided.

B. Receiver RLP

The FL RX RLP entity at the user terminal may maintain the items listed in Table 3 for each RLP flow to facilitate data reception on the forward link.

TABLE 3

Forward Link Receiver State

| Item | Description |
|---|---|
| $FRx(N)$ | Indicates the sequence number of the next data unit of new data expected to arrive. |
| $FRx(M)$ | Indicates the sequence number of the first missing data unit of data in the reassembly buffer. |
| Reassembly Structure | Tracks the status of each data unit and indicates whether it is received or not. |
| Retransmission Count Structure | Indicates the number of NAKs sent for each missing data unit in the reassembly structure. |
| NAK Timer | Timer used to retransmit another NAK or forward data to the higher layers. |

The reassembly structure tracks the status of each data unit and may be used to detect for missing data or holes. Each hole is a block of one or more contiguous data units that have not been received but have sequence numbers earlier than that of at least one data unit already received. Each hole may span any number of data units, e.g., one RLP frame, multiple RLP frames, or a partial RLP frame, depending on the results of the data transmission and retransmission. The retransmission count structure contains an entry for each hole in the reassembly structure. The entry for each hole indicates the number of NAKs already sent for that hole. If the maximum number of NAKs has been sent and the missing data is still not received, then the FL RX RLP entity assumes that this data will not be transmitted and forwards the data up to the next hole in the reassembly buffer to the higher layers as appropriate. Additionally, the FL RX RLP may forward the data up to the next hole in the reassembly buffer to the higher layer based on a latency.

The FL RX RLP entity sends a NAK whenever a new hole is detected, the NAK timer expires, a predetermined number of RLP frames have been received since the last NAK was sent, or some other criterion is satisfied. A new hole is detected if the FL RX RLP entity receives a data unit with a sequence number greater than the next expected data unit. The NAK timer indicates when to send another NAK and may be set to an adaptive value as described below. Each NAK sent by the FL RX RLP entity includes information for all holes in the reassembly structure, e.g., the sequence number of the first data unit in the hole and the size of the hole. Whenever a new NAK is sent, the FL RX RLP entity updates the entries in the retransmission count structure for all NAK'd holes and resets the NAK timer.

The FL TX RLP can retransmit data for an entire hole that has been NAK'd or only a portion of the NAK'd hole, e.g., if there is insufficient space in the RLP PDU to resend data for the entire hole. The FL TX RLP entity can also retransmit data for multiple NAK'd holes as separate retransmitted RLP frames in the same RLP PDU. Because the access point can retransmit any portion of an RLP frame, the user terminal keeps track of the status of each data unit instead of each RLP frame.

The FL RX RLP entity processes each received RLP frame, which may contain one or more data units of new data and/or retransmitted data. Each data unit X is identified by its sequence number, which may be determined based on (1) the sequence number for the first data unit in the RLP frame as indicated in the RLP frame header and (2) the location of data unit X within the RLP frame.

Figure 9:
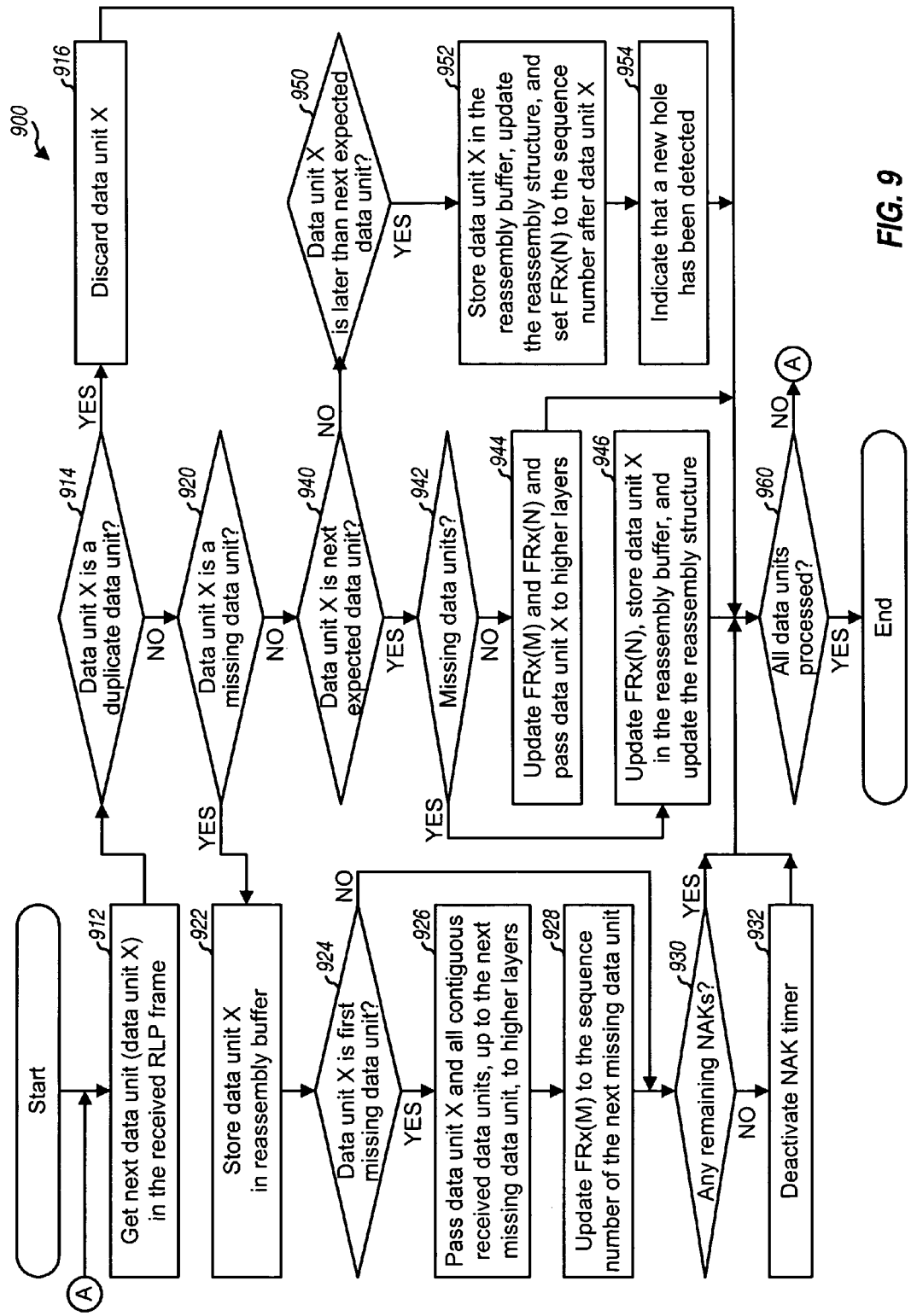
FIGS. 9 and 10 show processes performed by a forward link receiver (FL RX) RLP entity for data reception on the forward link.

FIG. 9 shows a flow diagram of a process 900 performed by the FL RX RLP entity for each received RLP. The FL RX RLP entity initially gets the first data unit (called data unit X) in the received RLP frame (block 912). A data unit is the smallest unit of transmission for RLP. The FL RX RLP entity determines whether data unit X is a duplicate data unit (block 914). Data unit X is a duplicate data unit if it (1) has a sequence number smaller than that of the first missing data unit, i.e., $X<FRx(M)$, or (2) has a sequence number between the sequence numbers of the first missing data unit and the next expected data unit, i.e., $FRx(M)<X<FRx(N)$, but is already stored in the reassembly buffer. If data unit X is a duplicate data unit, then the FL RX RLP entity discards data unit X (block 916) and proceeds to block 960.

If data unit X is not a duplicate data unit, as determined in block 914, then the FL RX RLP entity determines whether data unit X is a missing data unit (block 920). Data unit X is a missing data unit if it has a sequence number between the sequence numbers of the first missing data unit and the next expected data unit, i.e., $FRx(M) \leq X<FRx(N)$, and is not already stored in the reassembly buffer. If data unit X is a missing data unit, then the FL RX RLP entity stores data unit X in the reassembly buffer (block 922), updates the reassembly structure, and determines whether data unit X is the first missing data unit, i.e., whether $X=FRx(M)$ (block 924). If data unit X is the first missing data unit, then the FL RX RLP entity forwards data unit X and all contiguous received data units, up to the next missing data unit, to the higher layers (block 926). The FL RX RLP entity then removes the forwarded data units from the reassembly structure and updates $FRx(M)$ to the sequence number of the next missing data unit (block 928). After block 928 and also if the answer is 'No' for block 924, the FL RX RLP entity determines whether there are any NAKs outstanding (block 930). If the answer is 'No' for block 930, then the FL RX RLP entity deactivates the NAK timer (block 932). After block 932 and also if the answer is 'Yes' for block 930, the FL RX RLP entity proceeds to block 960.

If data unit X is not a missing data unit, as determined in block 920, then the FL RX RLP entity determines whether data unit X is the next expected data unit, i.e., whether $X=FRx(N)$ (block 940). If data unit X is the next expected data unit, then the FL RX RLP entity determines whether there are missing data units, which is indicated by $FRx(M)<FRx(N)$ (block 942). If the answer is 'No' for block 942 and there are no missing data units, which is indicated by $FRx(M)=FRx(N)$, then the FL RX RLP entity updates both $FRx(M)$ and $FRx(N)$ and forwards data unit X to the higher layers (block 942). Otherwise, if answer is 'Yes for block 942 and there is at least one missing data unit, which is indicated by $FRx(M)<FRx(N)$, then the FL RX RLP entity updates $FRx(N)$, stores data unit X in the reassembly buffer, and updates the reassembly structure (block 944). The FL RX RLP entity then proceeds to block 960 from blocks 944 and 946.

If data unit X is not the next expected data unit, as determined in block 940, then the FL RX RLP entity determines whether data unit X is a later data unit, i.e., whether $X>FRx(N)$ (block 950). If the answer is 'Yes', then the FL RX RLP entity stores data unit X in the reassembly buffer, updates the reassembly structure, sets $FRx(N)$ to the sequence number after data unit X, i.e., FRx(N)=X+1 (block 952), indicates that a new hole has been detected (block 954), and then proceeds to block 960.

In block 960, the FL RX RLP entity determines whether all data unit in the received RLP frame have been processed. If the answer is 'No', then the FL RX RLP entity returns to block 912 to process the next data unit in the received RLP frame. Otherwise, the processing for the received RLP frame terminates.

For the embodiment shown in FIG. 9, the FL RX RLP entity delivers data in order to the higher layers. If any data is missing, then the FL RX RLP entity waits for the retransmission of the missing data and delays sending any new data that arrives out of sequence to the higher layers until the missing data arrives.

Figure 10:
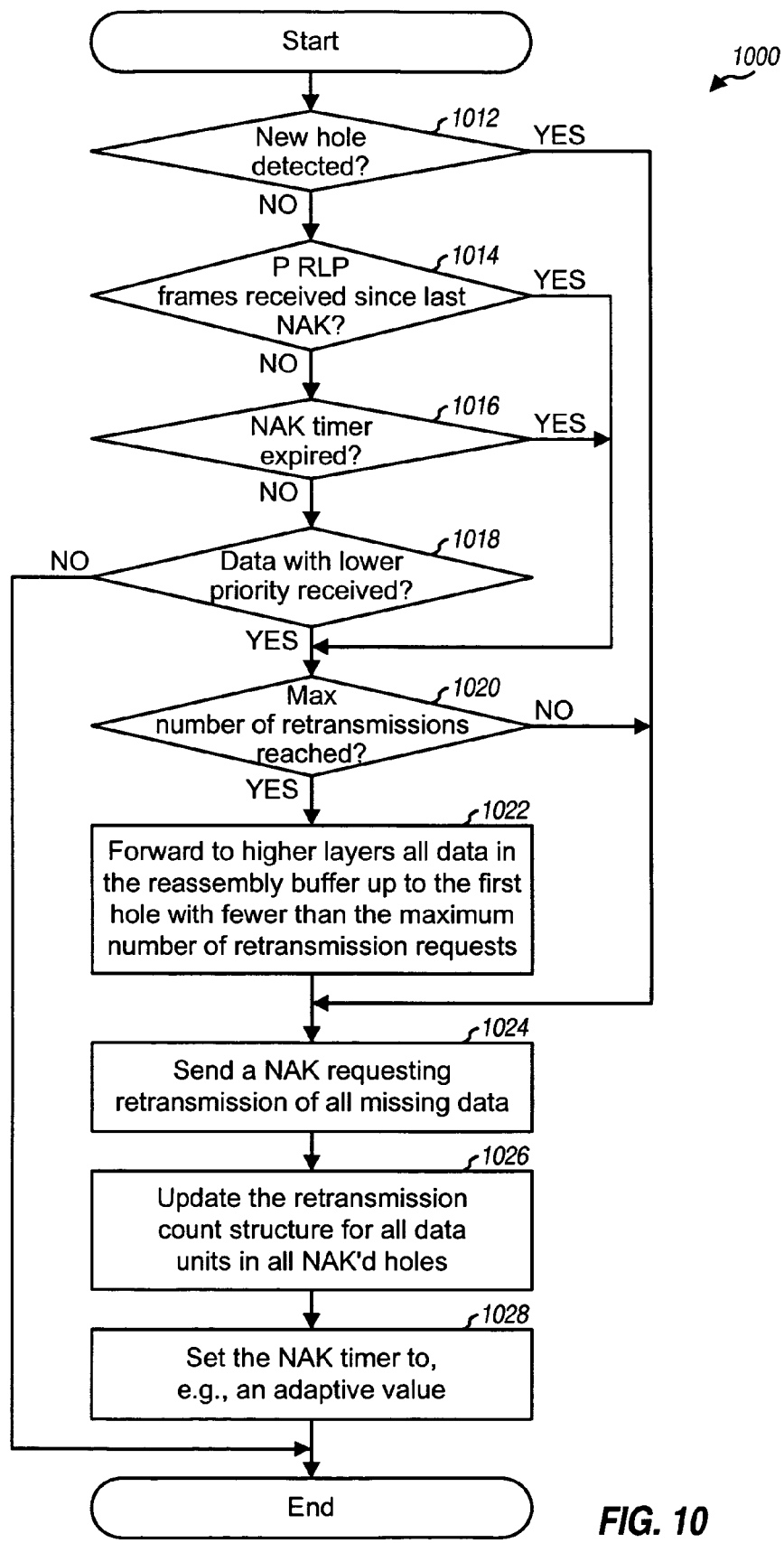

FIG. 10 shows a flow diagram of a process 1000 performed by the FL RX RLP entity, e.g., periodically and/or after each received RLP frame. The FL RX RLP entity determines whether a new hole has been detected (block 1012) and proceeds to block 1024 if the answer is 'Yes'. Otherwise, the FL RX RLP entity determines whether P RLP frames with later data have been received since the last NAK transmission (block 1014), whether the NAK timer has expired (block 1016), and/or whether data with lower priority has been received (block 1018). Later data is data with sequence numbers greater than the sequence number of the first data unit for the earliest hole requested for retransmission by the last NAK. P may be set to any value depending on the scheduling and transmission delays of the FL RLP, e.g., P=2. Block 1018 is used as another check to see if the NAK was received by the FL TX RLP entity successfully. Different types of data may be classified in different priority classes. For example, control data may be assigned the highest priority class, data to be retransmitted may be assigned the next highest priority class, and data to be sent for the first time may be assigned the lowest priority class. If lower priority data is received prior to higher priority data, then this may indicate that either (1) the NAK for the higher priority data did not get through or (2) the retransmission of the higher priority data failed. In either case, a new NAK may be sent if needed. The user terminal may also use other information to trigger transmission of another NAK, e.g., scheduling information for other user terminals with lower priority.

If the answer is 'Yes' for any one of the blocks 1014 through 1018, which indicates that the access point most likely did not receive the last NAK or the retransmitted data was lost again, then the FL RX RLP entity determines whether the maximum number of retransmission requests have been sent for any hole (block 1020). If the answer is 'Yes' for block 1020, then the FL RX RLP entity forwards to the higher layers all data in the reassembly buffer up to the first hole with fewer than the maximum number of retransmission requests (block 1022), updates FRx(M) accordingly, and then proceeds to block 1024. In block 1024, the FL RX RLP entity sends a NAK requesting retransmission of all missing data from the first missing data unit to the next expected data unit, i.e., from FRx(M) to FRx(N). The FL RX RLP entity then updates the retransmission count structure for all data units in all NAK'd holes (block 1026) and sets the NAK timer to an adaptive value computed as described below (block 1028). If none of the conditions in blocks 1012 through 1020 has occurred, then the process terminates.

If there is a variable delay in transmitting a NAK, which is often the case, then the FL RX RLP entity may set the NAK timer after the NAK is actually sent (as shown in FIG. 10) instead of when a hole is detected. The FL RX RLP entity may also start counting the number of RLP frames with later data after the NAK is actually sent.

In an embodiment, the NAK timer is set to an adaptive value, which may be computed as follows:

$$A_{frm}(m)=(1-g_f)\cdot A_{frm}(m-1)+g_f M_{frm}(m), \quad \text{Eq (2a)}$$

$$Err_{frm}(m)=M_{frm}(m)-A_{frm}(m), \quad \text{Eq (2b)}$$

$$D_{frm}(m)=(1-h_f)\cdot D_{frm}(m-1)+h_f|Err_{frm}(m)|, \quad \text{Eq (2c)}$$

$$RTO_{frm}(m)=A_{frm}(m)+k_f D_{frm}(m), \quad \text{Eq (2d)}$$

where $M_{frm}(m)$ is an inter-arrival time (IAT) for RLP frame m;

$A_{frm}(m)$ is an average of the inter-arrival times up to RLP frame m;

$Err_{frm}(m)$ is a difference between the IAT for RLP frame m and the average IAT;

$D_{frm}(m)$ is a mean deviation of the inter-arrival times up to RLP frame m;

$RTO_{frm}(m)$ is an adaptive value for the NAK timer; and $g_f$, $h_f$, and $k_f$ are constants used to compute the adaptive value.

The adaptive value for the NAK timer is computed in similar manner as the adaptive value for the retransmit timer, albeit with RLP frame inter-arrival times instead of data packet inter-arrival times. In equation set (2), the average and mean deviation of the inter-arrival times for received RLP frames are computed based on two IIR filters. The constants $g_f$ and $h_f$ determine the amount of averaging for the average and mean deviation, respectively. The constants may be set as, e.g., $g_f=0.125$, $h_f=0.25$, and $k_f=4$. Equations (2a), (2b), and (2c) may be computed for each received RLP frame, and equation (2d) may be computed whenever the NAK timer is set.

Equation set (2) computes the adaptive value for the NAK timer as a function of the average and mean deviation of the frame inter-arrival times at the FL RX RLP. The frame inter-arrival times may, in turn, be dependent on various factors such as loading on the forward link. The adaptive value for the NAK timer is indicative of when data for a NAK'd hole should have been received from the access point. The adaptive value is derived based on the statistics of the inter-arrival times for the RLP frames received by the FL RX RLP and thus adapts to traffic conditions.

Referring back to FIG. 3, when FL RX RLP entity 370 detects a hole, it sends a NAK. Since RL TX RLP entity 380 is not described as a NAK transmitter but as a data unit transmitter for the reverse link, the NAK is forwarded directly to the MAC. FL RX RLP entity 370 may also provide the NAK to a signaling application transmitter, which would then forward the NAK to the MAC. This signaling application is not shown in FIG. 3 for simplicity.

2. Reverse Link RLP

The RL RLP takes advantage of the following characteristics for reverse link transmission:

1. A reliable broadcast ACK channel carries feedback for data transmission on the reverse link and NAKs are not needed for the RL RLP; and
2. The access point schedules the user terminal for data transmission on the reverse link and can quickly schedule retransmission, if needed.

In an embodiment, the access point generates an ACK at the physical layer for each RLP frame received correctly, combines the ACKs for all RLP frames from all user terminals received in the previous slot into a single ACK message, generates and appends a (e.g., 16-bit) CRC value to the ACK message, and broadcasts the ACK message on the ACK channel to all user terminals. In another embodiment, the ACKs are generated at the physical layer and combined with other control channel information, for example, power control up/down indicators, and/or channel assignments, and appended with a CRC value and broadcast on a control channel to all user terminals. In yet another embodiment, the set of ACKs and any control channel information are partitioned into subsets, where each subset is appended with a CRC value and broadcast separately. For example, each subset may be power controlled to achieve a target PER for a given set of user terminals based on their reported channel conditions. The user terminals can receive the ACKs sent by the access point with high reliability because of the CRC used for the ACK channel, i.e., the CRC ensures that there is a very low probability of a NAK being mistaken for an ACK if the ACK channel is decoded.

The probability of erroneously detecting an ACK on the ACK channel when none was sent (i.e., the NAK-to-ACK probability) is sufficiently small, and this error event may be ignored. In the rare event that an ACK is detected by the user terminal when none was sent by the access point, and the CRC for the ACK channel passes, then the access point will have a hole in the received data. This hole results from the access point failing to receive the RLP frame and the user terminal thinking that the frame was received correctly because of the mis-detected ACK. This hole results in one or more lost data packets. The higher layers may then attempt a recovery if needed.

If the access point schedules transmission on the reverse link, then the access point knows when to expect RLP frames from the user terminal. Whenever RLP frames are not received as expected, the access point may schedule the user terminal for retransmission. In an embodiment, the RL RLP has the following characteristics:

1. The user terminal transmits one RLP frame at a time and retransmits this RLP frame as many times as needed until the RLP frame is received correctly or the maximum number of retransmissions has been reached.
2. The access point receives RLP frames, and thus data packets, in sequential order.
3. Duplicate detection is simple and needed only when an ACK is sent by the access point, the CRC for the ACK channel fails, and the user terminal assumes a NAK was received and resends the last transmitted RLP frame.
4. If the user terminal fails to receive an assignment to transmit on the reverse link, then the access point receives no data and can reschedule automatically.

Figure 11:
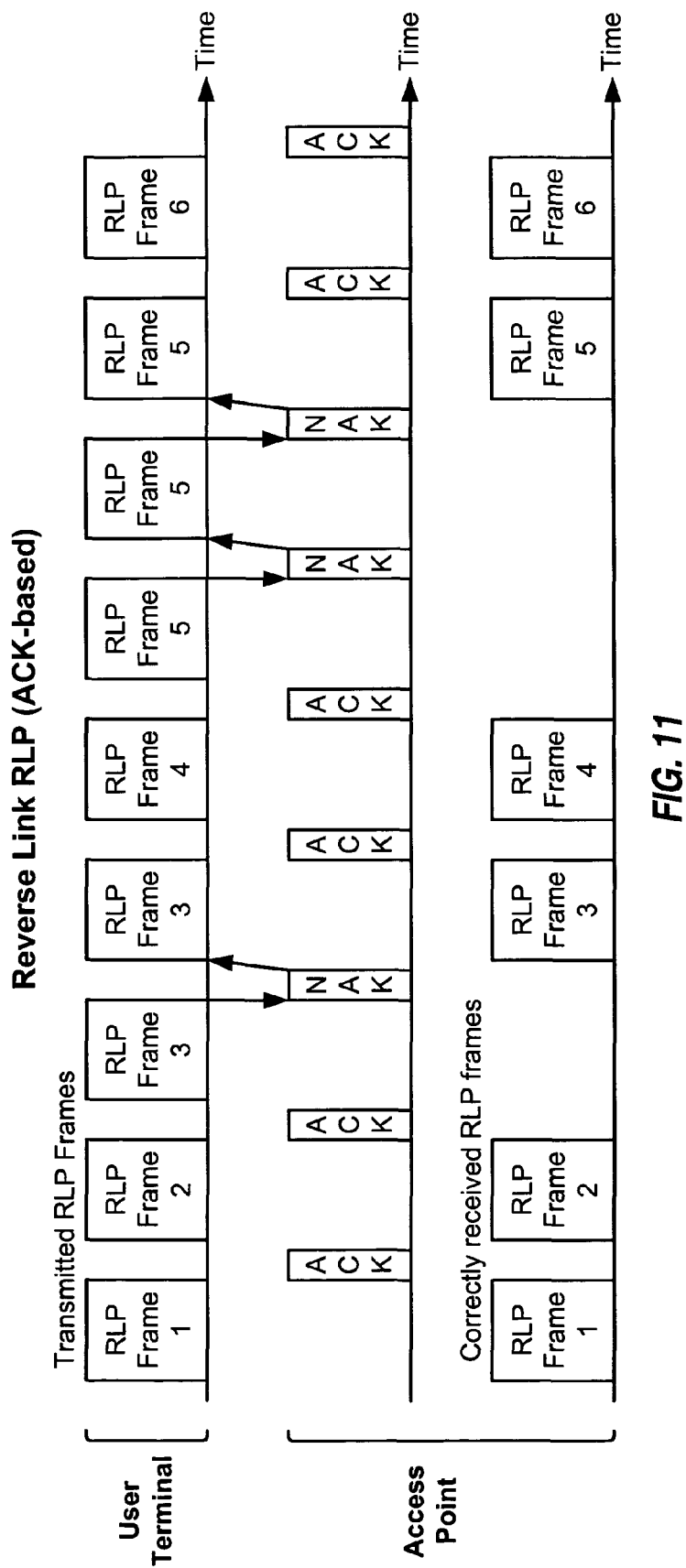
FIG. 11 shows data transmission with an ACK-based RLP.
Figure 12:
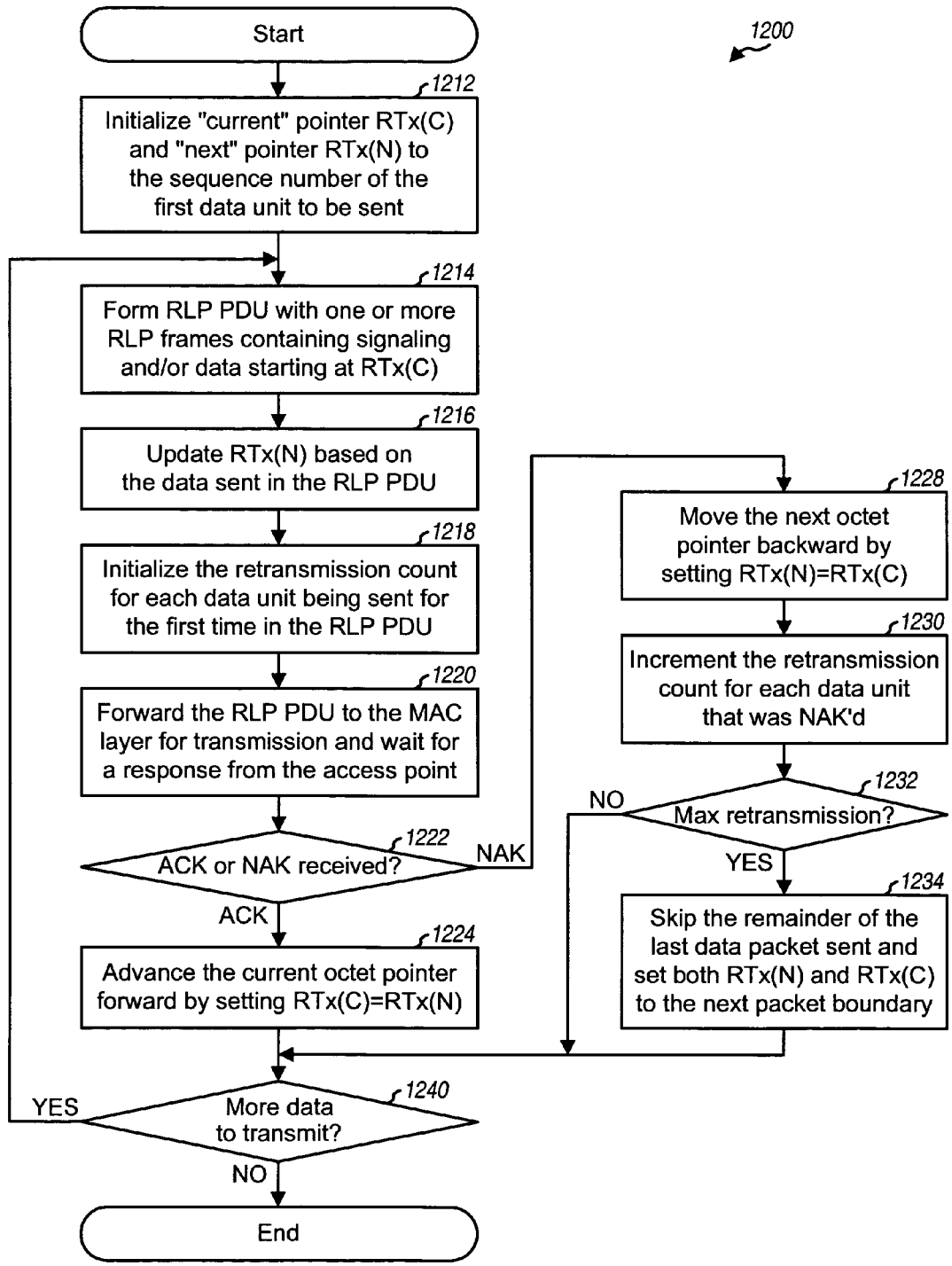
FIG. 12 shows a process performed by a reverse link transmitter (RL TX) RLP entity for data transmission on the reverse link.

FIG. 11 shows data transmission on the reverse link for one RLP flow with the ACK-based RL RLP. In FIG. 11, ACKs and NAKs are sent by the physical layer for the RLP frames. The user terminal sequentially transmits RLP frames 1, 2 and 3. The access point receives RLP frames 1 and 2 correctly and sends ACKs for these frames. The access point fails to receive RLP frame 3 and either sends a NAK (as shown in FIG. 12) or sends no ACK (which may be viewed as an implicit NAK). The user terminal retransmits RLP frame 3 upon receiving the NAK. The user terminal then transmits RLP frames 4 and 5 upon receiving the ACK for RLP frame 3. The access point receives RLP frame 4 correctly and sends an ACK, and fails to receive RLP frame 5 and sends a NAK. The user terminal retransmits RLP frame 5 twice until an ACK is received, and then transmits RLP frame 6.

A. Transmitter RLP

The RL TX RLP entity at the user terminal may maintain the items listed in Table 4 for each RLP flow to facilitate data transmission on the reverse link.

TABLE 4

Reverse Link Transmitter State

| Item | Description |
| --- | --- |
| RTx(N) | Indicates the next data unit of data to be transmitted. |
| RTx(C) | Indicates the first data unit in the current RLP frame being sent. |
| Sequence Number | Indicates the sequence number of the next data unit to be transmitted. |
| Retransmission Count | Indicates the number of transmission attempts for the current RLP frame. |

FIG. 12 shows a flow diagram of a process 1200 performed by the RL TX RLP entity for data transmission on the reverse link. For simplicity, the following description assumes that only one RLP flow is active. The RL TX RLP entity initializes RTx(N) and RTx(C) to the sequence number of the first data unit to be sent (block 1212). Whenever the user terminal is scheduled for data transmission, the RL TX RLP entity forms an RLP PDU with one or more RLP frames containing control data and/or packet data starting at RTx(C) (block 1214). The RLP PDU size is determined by a MAC channel assignment. The RL TX RLP entity then updates RTx(N) based on the data sent in the RLP PDU so that RTx(N) points to the next data unit to be sent if this RLP PDU is received correctly (block 1216). The RL TX RLP entity also initializes the retransmission count for each data unit being sent for the first time in the RLP PDU (block 1218). The RL TX RLP entity then forwards the RLP PDU to the MAC layer for transmission and waits for a response from the access point (block 1220).

The RL TX RLP entity determines whether an ACK or NAK was received for the RLP PDU just sent (block 1222). If an ACK was received, then the RL TX RLP entity advances the current data unit pointer forward by setting RTx(C)=RTx(N) (block 1224) and proceeds to block 1240. If a NAK was received, then the RL TX RLP entity moves the next data unit pointer backward by setting RTx(N)=RTx(C) (block 1228) and increments the retransmit count for each data unit that was NAK'd (block 1230). The RL TX RLP entity then determines whether the maximum number of retransmissions has been reached for any data unit (block 1232). If the answer is 'Yes', then the RL TX RLP entity deliberately creates a hole in the data stream, skips the remainder of the last data packet sent, and sets both RTx(N) and RTx(C) to the first packet boundary that occurs after the last value of RTx(C) (block 1234). Alternatively, the RL TX RLP entity may advance RTx(C) to RTx(N), and not necessarily to the next packet boundary, since it is possible that the access point did actually receive the last RLP frame and the user terminal just failed to receive the ACK from the access point. In any case, if the answer is 'No' for block 1232 and also after block 1234, the RL TX RLP entity proceeds to block 1240. In block 1240, the RL TX RLP entity determines whether there is more data to send. The RL TX RLP returns to block 1214 to wait for the next scheduling assignment from the access point if the answer is 'Yes' and terminates the data transmission otherwise.

B. Receiver RLP

The RL RX RLP entity at the access point may maintain the items listed in Table 5 for each RLP flow to facilitate data reception on the reverse link.

TABLE 5

Reverse Link Receiver State

| Item | Description |
| --- | --- |
| RRx(N) | Indicates the sequence number of the next data unit expected to arrive. |
| Reassembly Structure | Tracks the status of each data unit and indicates whether it was received or not. |

The reassembly structure is used to keep track of partial data packets for the higher layers and is not needed for RLP NAKs.

Figure 13:
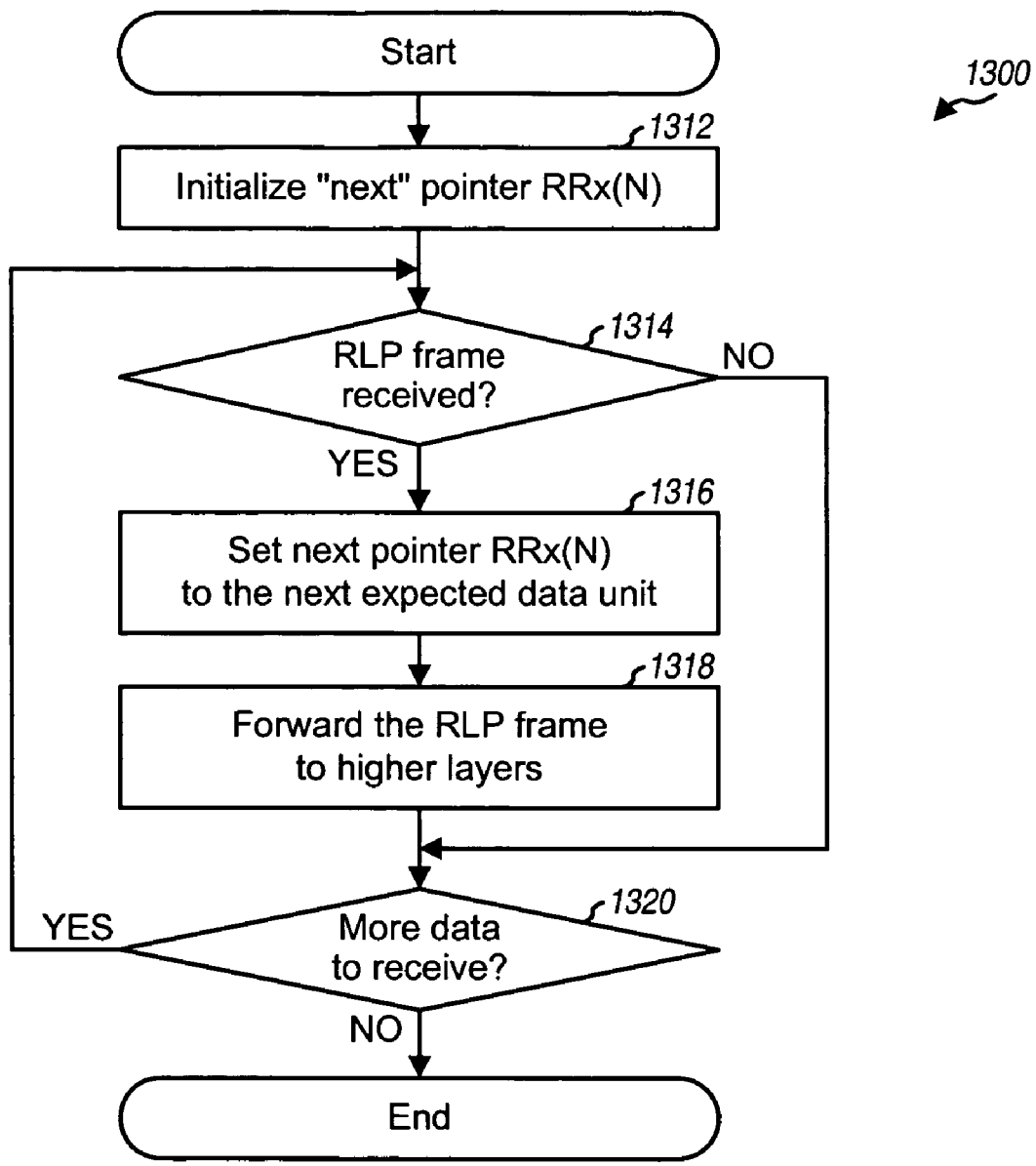
FIG. 13 shows a process performed by a reverse link receiver (RL RX) RLP entity for data reception on the reverse link.

FIG. 13 shows a flow diagram of a process 1300 performed by the RL RX RLP entity for data reception on the reverse link. The RL RX RLP entity initializes RRx(N) (block 1312). The RL RX RLP entity then determines whether an RLP frame was received (block 1314). The physical layer processes each MAC PDU and, if the MAC PDU is decoded correctly, forwards the RLP frame(s) carried in the MAC PDU to the RL RX RLP entity and sends an ACK for the MAC PDU. If the answer is 'Yes' for block 1314, then the RL RX RLP entity sets RRx(N) to the next expected data unit (block 1316) and forwards the RLP frame to the higher layers (block 1318). In another embodiment, the RLP may buffer the frames and only send completed packets to the higher layers, i.e., the RLP reassembles the packets. If the answer is 'No' for block 1314, which may be the case if the user terminal did not receive the assignment to transmit on the reverse link or the access point decoded the MAC PDU in error, then RRx(N) remains the same and is updated on the next RLP frame that is received correctly. From blocks 1314 and 1318, the RL RX RLP entity determines whether there is more data to receive (block 1320). The RL RX RLP entity returns to block 1314 to wait for the next RLP frame if the answer is 'Yes' for block 1320 and terminates otherwise.

If the user terminal fails to decode an ACK on the ACK channel, i.e., the frame was received correctly, but the user terminal did not detect this, then the user terminal may transmit a duplicate RLP frame. In this case, the RL TX RLP and RL RX RLP will be out of sync and can regain sync if the duplicate RLP frame is received successfully. If the duplicate RLP frame contains new data, then the RL RX RLP stores the new data and updates RRx(N) accordingly.

3. RLP Handoff

For an FL RLP handoff from access point A to access point B, the FL TX RLP state may be transferred from access point A to access point B. The FL TX RLP state may be defined as all of the data in the three buffers that has not yet been transmitted. Access point A maintains a copy of the transmitted buffer for a fixed period of time after handoff in case of NAKs for the data stored in this buffer. The retransmit timer at access point B and the NAK timer at the user terminal are both reset to default values on an FL RLP handoff. This is because for a TCP-based application, the retransmit timer is a function of packet round trip time (RTT) and congestion window size, both of which may be different for different access points. After handoff, access point B acts as the RLP source, except for retransmission requests for data that was not transferred. These requests may be handled via communication with access point A. There is no packet loss due to RLP as transmission occurs uninterrupted. This handoff design reduces backhaul communication between the two access points while maintaining the FL TX RLP state. This design typically does not require excessive backhaul communication since the entire state is not copied from access point A and a majority of the state is expected to be in the transmitted buffer.

For an RL RLP handoff, the RL RLP state is reset to the initial state at the user terminal and the new access point B. The user terminal sends data from the beginning of the current data packet. The old access point A discards any partial packets that it has received. Up to one packet is resent in a RL RLP handoff.

For clarity, specific NAK-based FL RLP and ACK-based RL RLP have been described above. The NAK-based FL RLP may also be used for the reverse link, and ACK-based RL RLP may be used for the forward link (with a reliable reverse link feedback channel).

The RLPs described herein may be used for various wireless communication networks including CDMA, TDMA, FDMA, and OFDMA networks. These RLPs may be used for single-carrier and multi-carrier networks. Multiple carriers may be provided by orthogonal frequency division multiplexing (OFDM) or some other construct.

The RLP designs described herein may be implemented by various means. For example, the transmitter and receiver RLP entities may be implemented in hardware, software, or a combination thereof. For a hardware implementation, the RLP entities may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmitter and receiver RLP entities may be implemented with modules (e.g., procedures, functions, and so on) that perform the functions described herein. The software codes may be stored in a memory unit (e.g., memory unit 352 or 392 in FIG. 3) and executed by a processor (e.g., controller 350 or 390). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of exchanging data in a communication system, comprising:
    transmitting data in accordance with a first radio link protocol (RLP) via a forward link; and
    receiving data in accordance with a second RLP via a reverse link, wherein the first and second RLPs are asymmetric and have different feedback mechanisms for the first RLP via the forward link and for the second RLP via the reverse link, the forward link employing a negative acknowledge (NAK)-based feedback and the reverse link employing an acknowledgement (ACK)-based feedback;

retransmitting the transmitted data in response to receiving a NAK;

setting a NAK timer to an adaptive value when there is no more data to transmit, wherein the adaptive value of the NAK timer is a function of frame inter-arrival times at a forward link receiving entity; and retransmitting a portion of last transmitted data upon expiration of the timer.

2. The method of claim 1, further comprising:
sending acknowledgments (ACKs) for the received data.

3. The method of claim 1, wherein the transmitting data comprises transmitting each of a plurality of data frames once and in a sequential order to a receiving entity, and retransmitting out of sequence data frames decoded in error by the receiving entity.

4. The method of claim 1, wherein the transmitting data comprises transmitting a plurality of data frames in a sequential order, one data frame at a time until the data frame is decoded correctly by a receiving entity or a maximum number of transmissions has been reached for the data frame.

5. An apparatus in a communication system, comprising:
a first entity operative to transmit data in accordance with a first radio link protocol (RLP) via a first link, the first RLP is negative acknowledgement (NAK)-based such that negative acknowledgments (NAKs) are received for missing transmitted data; and a second entity operative to receive data in accordance with a second RLP via a second link, the second RLP is acknowledgement (ACK)-based, wherein the first and second RLPs are asymmetric and have different feedback mechanisms for the first RLP via the first link and for the second RLP via the second link such that the second entity receives a NAK requesting retransmission of missing transmitted data; and a NAK timer with an adaptive value, wherein the adaptive value is determined as a function of inter-arrival times of RLP frames at a receiving entity.

6. The apparatus of claim 5, wherein the second entity is operative to send acknowledgments (ACKs) for the received data.

7. The apparatus of claim 5, wherein the first entity is operative to transmit each of a plurality of data frames once and in a sequential order to a receiving entity and to retransmit out of sequence data frames decoded in error by the receiving entity.

8. The apparatus of claim 5, wherein the first entity is operative to transmits a plurality of data frames in a sequential order, one data frame at a time until the data frame is decoded correctly by a receiving entity or a maximum number of transmissions have been reached for the data frame.

9. The apparatus of claim 5, wherein the first entity is operative to transmit data via a forward link, and wherein the second entity is operative to receive data via a reverse link.

10. The apparatus of claim 5, wherein the first entity is operative to transmit data via a reverse link, and wherein the second entity is operative to receive data via a forward link.

11. An apparatus in a communication system, comprising:
means for transmitting data in accordance with a first radio link protocol (RLP) via a first link based in part on a negative acknowledgement (NAK) scheme;

means for receiving data in accordance with a second RLP via a second link based in part on an acknowledgement (ACK) scheme, wherein the first and second RLPs are asymmetric and have different feedback mechanisms for the first RLP via the first link and for the second RLP via the second link; and means for timing data retransmissions that can be set to an adaptive value based at least on one or more functions of inter-arrival times of RLP frames at a receiving entity.

12. The apparatus of claim 11, wherein the means for transmitting data comprises means for transmitting each of a plurality of data frames once and in sequential order by a receiving entity, and means for retransmitting out of sequence data frames decoded in error by the receiving entity.

13. The apparatus of claim 12, wherein the means for transmitting data comprises means for transmitting a plurality of data frames in sequential order, one data frame at a time until the data frame is decoded correctly or a maximum number of transmissions has been reached for the data frame.

14. A method of exchanging data in a communication system, comprising:
transmitting data in accordance with a first radio link protocol (RLP) via a forward link based in part on a negative acknowledgement (NAK) scheme; and receiving data in accordance with a second RLP via a reverse link based in part on an acknowledgement (ACK) scheme, wherein the first and second RLPs are asymmetric and have different feedback mechanisms for the first RLP via the forward link and for the second RLP via the reverse link;

retransmitting missing data in response to receiving a NAK;

computing a value based on statistics of inter-arrival times for RLP frames received by the first RLP from higher layers;

setting a timer to the computed value when there is no more data to transmit; and retransmitting a portion of last transmitted data upon expiration of the timer.

15. The method of claim 14, wherein the transmitting data in accordance with the first RLP comprises transmitting sequential order to a receiving entity, and each of a plurality of data frames once and in a retransmitting out of sequence data frames decoded in error by the receiving entity.

16. The method of claim 14, wherein the receiving data in accordance with the second RLP comprises receiving a plurality of data frames on the reverse link in a sequential order, one data frame at a time unless a maximum number of transmissions has been reached for the data frame.

17. The method of claim 14, further comprising:
sending an acknowledgment (ACK) for each data frame decoded correctly by the second RLP via the reverse link.

18. The method of claim 17, wherein the sending the ACK comprises sending the ACK on a signaling channel having a low probability of erroneous detection of an ACK if none was sent.

19. The method of claim 14, further comprising:
scheduling transmission of data on the reverse link; and
scheduling retransmission of the data if not received within a predetermined amount of time after scheduling the transmission of the data.

20. A method of exchanging data in a communication system, comprising:
receiving data in accordance with a first radio link protocol (RLP) via a forward link based in part on a negative acknowledgement (NAK) scheme; and transmitting data in accordance with a second RLP via a reverse link based in part on an acknowledgement (ACK) scheme, wherein the first and second RLPs are asymmetric and have different feedback mechanisms for the first RLP via the forward link and for the second RLP via the reverse link;

detecting missing data in a data stream received by the first RLP;

sending a negative acknowledgment (NAK) to request retransmission of the missing data;

setting a timer by the first RLP, upon sending the NAK to an adaptive value computed in accordance with statistics of inter-arrival times for RLP frames received; and sending another NAK upon expiration of the timer.

21. The method of claim 20, wherein the receiving data in accordance with the first RLP comprises for each of a plurality of data frames, receiving the data frame in a sequential order if transmitted once, and receiving the data frame out of sequence if retransmitted at least one due to decoding error.

22. The method of claim 20, wherein the transmitting data in accordance with the second RLP comprises transmitting a plurality of data frames in a sequential order, one data frame at a time until the data frame is decoded correctly by a receiving entity or a maximum number of transmissions has been reached for the data frame.

23. The method of claim 20, further comprising:
sending another NAK if a predetermined number of data frames are received without receiving a retransmission of the missing data requested for retransmission.

24. The method of claim 20, further comprising:
sending another NAK if data with lower priority is received prior to the missing data requested for retransmission.

25. The method of claim 20, further comprising:
receiving an acknowledgment (ACK) for each data frame transmitted by the second RLP and decoded correctly by a receiving entity; and
retransmitting each data frame for which an ACK was not received.

26. The method of claim 25, wherein the receiving the ACK for each correctly decoded data frame comprises receiving the ACK via a signaling channel having a low probability of erroneous detection of an ACK if none was sent.

27. A method of transmitting data in a communication system, comprising:
transmitting data in accordance with a first radio link protocol (RLP) via a communication link based in part on a negative acknowledgement (NAK) RLP scheme;

detecting no more data to transmit;

computing a value based an average and a mean deviation of inter-arrival times for data packets received by the RLP from higher layers;

setting a timer to the computed value;

retransmitting a portion of previously transmitted data upon expiration of the timer; and receiving data in accordance with a second RLP via a disparate communication link based in part on an acknowledgement (ACK) RLP scheme, wherein the first RLP via the communication link and the second RLP via the disparate communication link each use a different feedback mechanism.

28. The method of claim 27, wherein computing the value comprises limiting the value to be smaller than a timeout value for a higher layer protocol transmitting the data.

29. A method of receiving data in a communication system, comprising:
receiving data frames in accordance with a first radio link protocol (RLP) via a communication link based in part on a negative acknowledgement (NAK) RLP scheme;

detecting missing data in a data stream received by the RLP via the communication link;

sending a NAK to request retransmission of the missing data;

computing a value based on statistics of inter-arrival the data frames received by the RLP;

setting a NAK timer to the computed value;

sending another NAK upon expiration of the NAK timer; and transmitting data in accordance with a second RLP via a disparate communication link based in part on an acknowledgement (ACK) RLP scheme, wherein the first RLP via the communication link and the second RLP via the disparate communication link each use a different feedback mechanism.

30. The method of claim 29, wherein the computing the value comprises
determining an average and a mean deviation of inter-arrival times for the data frames received by the RLP, and
computing the value based on the average and the mean deviation of the inter-arrival times.

31. The method of claim 29, wherein the sending the NAK comprises sending the NAK if less than a maximum number of retransmission requests has been sent for the missing data.

* * * * *